(12) United States Patent
Imura

(10) Patent No.: US 8,767,206 B2
(45) Date of Patent: Jul. 1, 2014

(54) SPECTRAL CHARACTERISTIC MEASURING DEVICE, METHOD FOR CORRECTING SPECTRAL CHARACTERISTIC MEASURING DEVICE, AND NON-TRANSITORY COMPUTER READABLE RECORDING MEDIUM

(75) Inventor: Kenji Imura, Toyohashi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/000,366

(22) PCT Filed: Feb. 3, 2012

(86) PCT No.: PCT/JP2012/052496
§ 371 (c)(1),
(2), (4) Date: Aug. 19, 2013

(87) PCT Pub. No.: WO2012/111455
PCT Pub. Date: Aug. 23, 2012

(65) Prior Publication Data
US 2013/0321802 A1    Dec. 5, 2013

(30) Foreign Application Priority Data
Feb. 17, 2011   (JP) .................................. 2011-032131

(51) Int. Cl.
*G01J 3/28*   (2006.01)

(52) U.S. Cl.
USPC .......................................................... 356/326

(58) Field of Classification Search
USPC .................................. 356/300, 326, 328, 334
See application file for complete search history.

(56) References Cited

U.S. PATENT DOCUMENTS

| 7,116,417 B2 | 10/2006 | Imura |
| 7,839,502 B2 | 11/2010 | Lukas |
| 2011/0263955 A1* | 10/2011 | Narita et al. .................. 600/341 |

FOREIGN PATENT DOCUMENTS

| JP | 2005-069784 | 3/2005 |
| JP | 2008-185565 | 8/2008 |
| JP | 2008-298776 | 12/2008 |

* cited by examiner

*Primary Examiner* — Tarifur Chowdhury
*Assistant Examiner* — Abdullahi Nur
(74) *Attorney, Agent, or Firm* — Cozen O'Connor

(57) ABSTRACT

Wavelength information indicating a correspondence relationship between a plurality of light receiving elements of a light receiving unit and wavelengths of pieces of lights is stored. First and second intensity distributions of the light related to first and second dispersion images are acquired based on a signal outputted from each of the light receiving elements when a monochromatic light is passed through a opening of a light shielding body and first and second dispersion images related to primary and secondary diffracted light are formed on the light receiving unit. An estimated intensity distribution of the light related to the second dispersion image is calculated from the first intensity distribution according to a predetermined relational expression. A change amount related to the wavelength information is calculated based on the estimated intensity distribution and the second intensity distribution. The wavelength information is corrected according to the change amount.

16 Claims, 10 Drawing Sheets

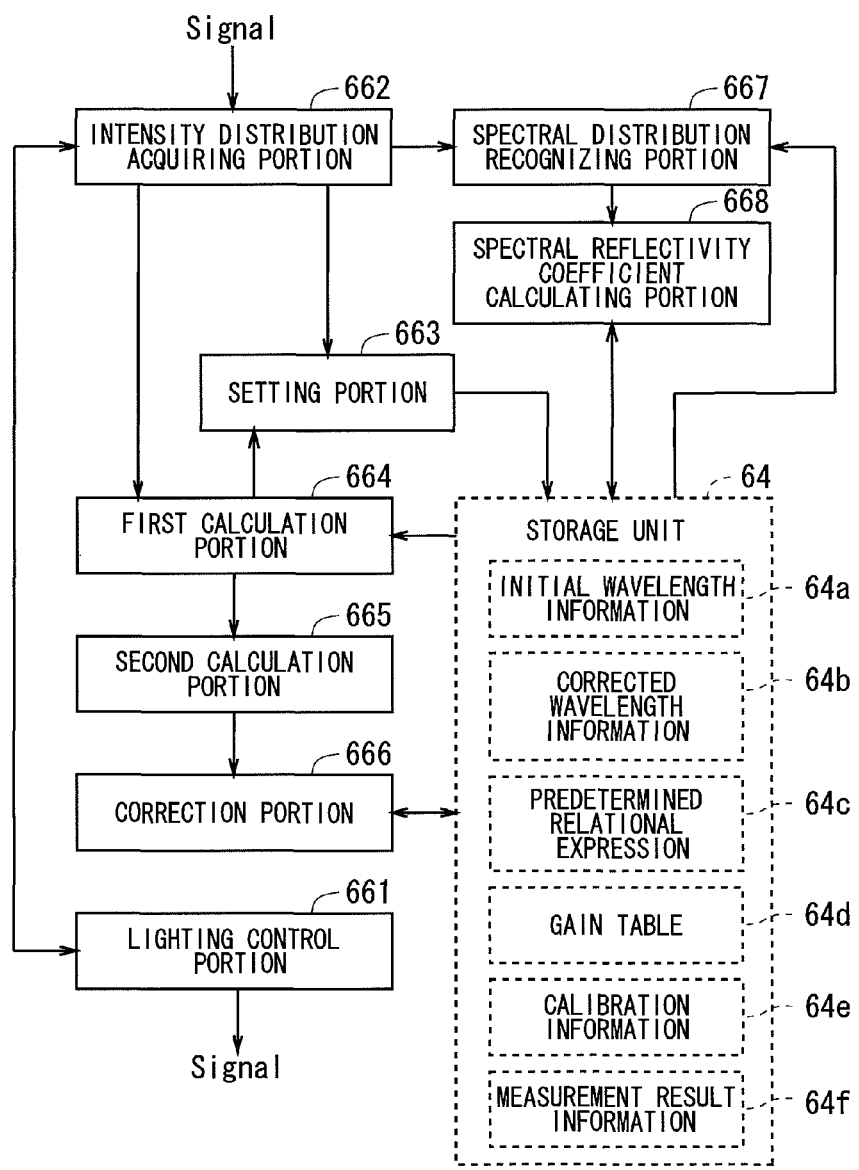

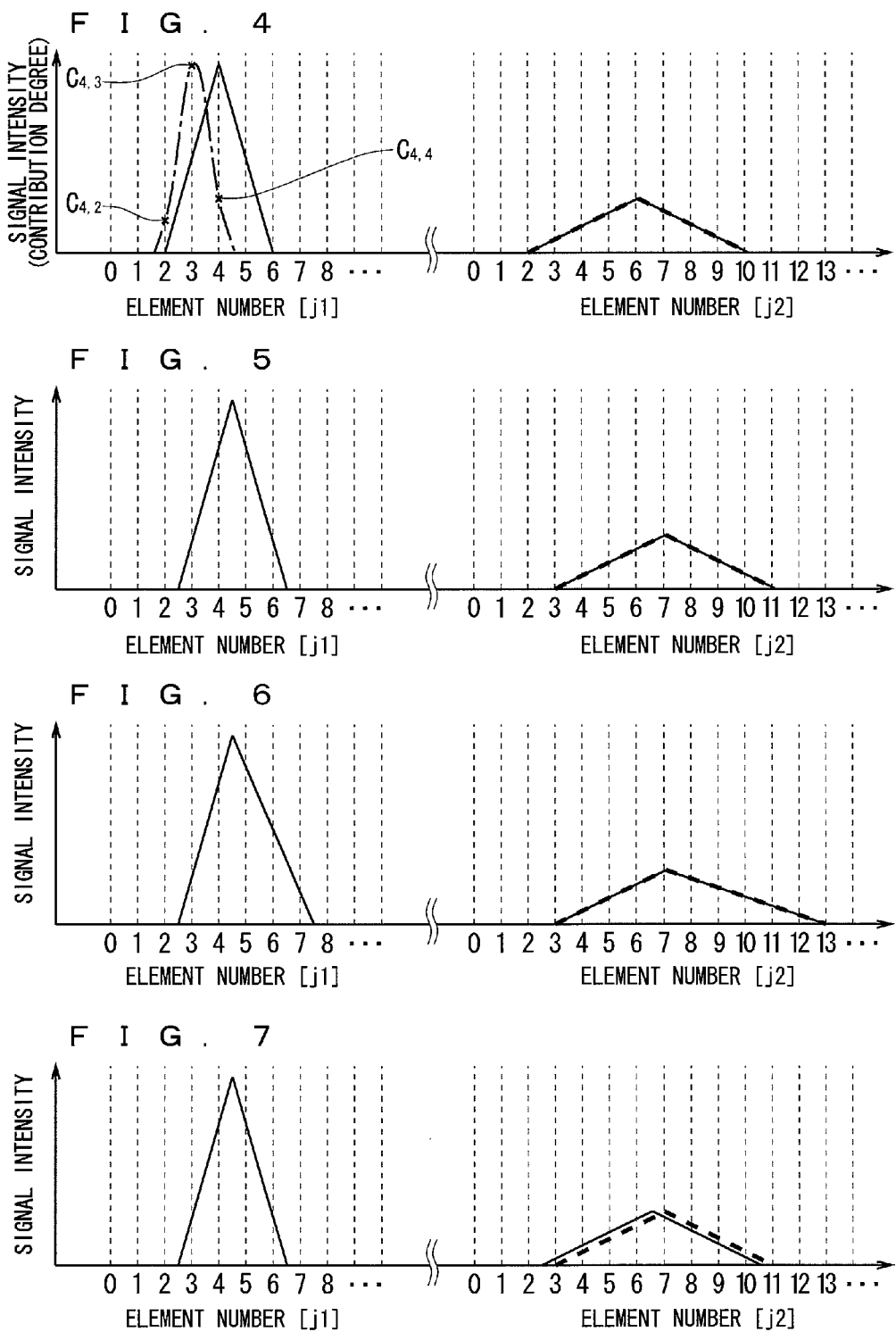

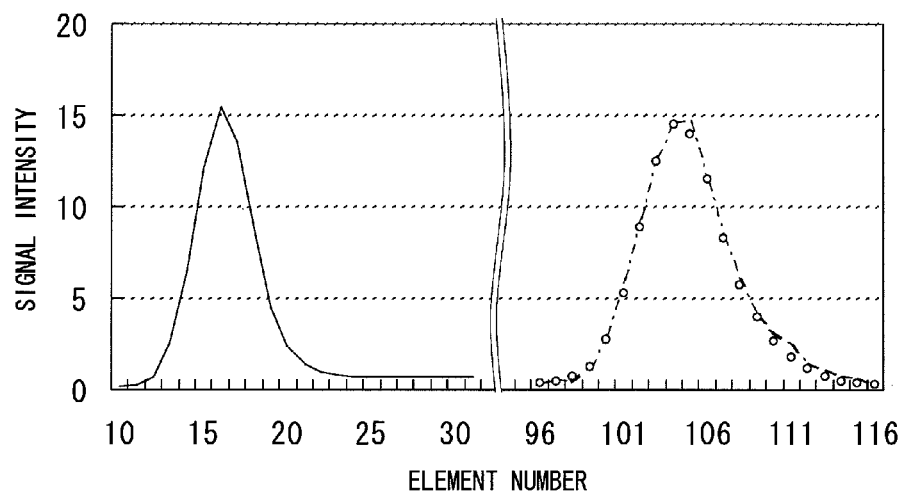
F I G . 1 0
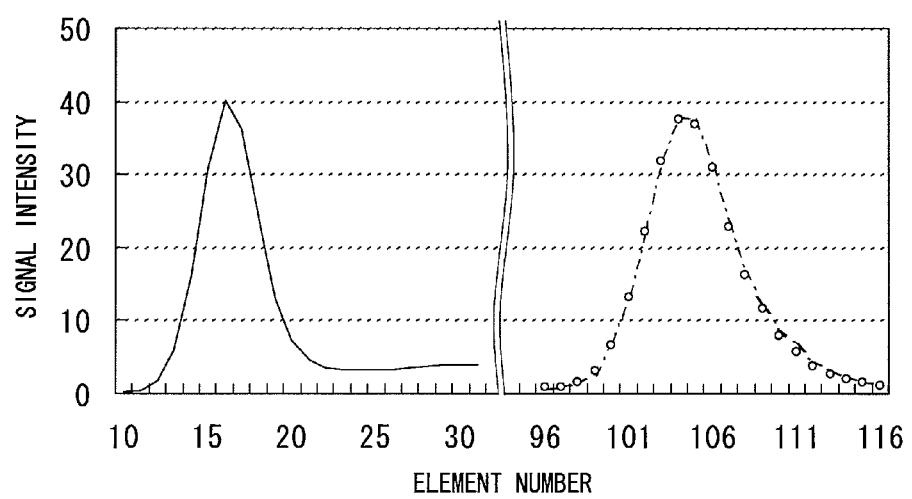
F I G . 1 1

US 8,767,206 B2

SPECTRAL CHARACTERISTIC MEASURING DEVICE, METHOD FOR CORRECTING SPECTRAL CHARACTERISTIC MEASURING DEVICE, AND NON-TRANSITORY COMPUTER READABLE RECORDING MEDIUM

RELATED APPLICATIONS

This is a U.S. national stage of International application No. PCT/JP2012/052496 filed on Feb. 3, 2012.

This application claims the priority of Japanese application no. 2011-032131 filed Feb. 17, 2011, the entire content of which is hereby incorporated by reference.

TECHNICAL FIELD

The present invention relates to techniques of correcting a device for measuring spectral characteristics, and for example, a technique of correcting a shift in wavelength that occurs in measurement results according to various temporal and thermal changes that may occur in polychromators, and in particular, in a polychromator in which a plastic molded article is used for the main configuring elements.

BACKGROUND ART

A polychromator including a light receiving element array in which a great number of light receiving elements are arrayed and a diffraction grating is often used for a measurement device that uses light dispersion such as a spectrophotometer, spectroscopic luminance meter, and the like (also referred to as a spectroscopic system). The diffraction grating may disperse the light to be measured (also referred to as target light to be measured) according to a wavelength. The light receiving array may acquire an electric signal corresponding to an intensity of the light for every wavelength by receiving the light dispersed by the diffraction grating in the great number of elements arrayed at a predetermined pitch (also referred to as an element pitch). A spectral distribution of the measuring target light is thereby obtained.

In such a polychromator, a case of adopting a plastic molded article for the main constituents such as the diffraction grating, housing, and the like is increasing for the purpose of reducing the manufacturing cost. However, the plastic molded article may cause thermal change and temporal change due to change in surrounding temperature, alleviation in internal stress after molding, and the like. Thus, a shift in wavelength (also referred to as a wavelength shift) may occur in the spectral distribution, which is the measurement result of the polychromator.

A spectral device, and a correction method of the spectral device capable of maintaining the initial measurement accuracy by correction corresponding to the wavelength shift have been proposed (Japanese Patent Application Laid-Open No. 2005-69784, etc.). In the technique of FIG. 4 of Japanese Patent Application Laid-Open No. 2005-69784, monochromatic light is entered to a slit and dispersed by the diffraction grating. In this case, a shift amount (a first image shift amount) from an initial position of an image (also referred to as a first dispersion image) formed on the light receiving element array by primary diffracted light of the slit-passing light is obtained. A shift amount (a second image shift amount) from an initial position of an image (also referred to as a second dispersion image) formed on the light receiving element array by a secondary diffracted light of the silt-passing light is also obtained. An image shift amount in which influences caused by the wavelength change of the monochromatic light are removed is then obtained based on the first and second image shift amounts, and then the image shift amount is converted to a wavelength shift amount.

In this technique, a phenomenon in which the first image shift amount and the second image shift amount are the same in the wavelength shift caused by the temporal and thermal changes of the polychromator, and the second image shift amount is twice the first image shift amount in the wavelength shift caused by the wavelength change of the monochromatic light is used. Specifically, the wavelength shift amount that occurs from the polychromator in which the influences caused by the wavelength change of the monochromatic light are removed can be acquired from the first and second image shift amounts. The correction of the spectral device corresponding to the wavelength shift amount then can be carried out.

SUMMARY OF THE INVENTION

Problems to be Solved by the Invention

As described above, in the technique of Japanese Patent Application Laid-Open No. 2005-69784, both the shift amount (the first image shift amount) from the initial position of the first dispersion image and the shift amount (the second image shift amount) from the initial position of the second dispersion image need to be obtained.

However, if the shapes of the first dispersion image and the second dispersion image change from the initial shapes, the first and second image shift amounts may not be accurately obtained. Such a change in the shapes of the first dispersion image and the second dispersion image may occur from the change in the spectral distribution of the monochromatic light and the change in the spectral reflection characteristics of a specimen if the monochromatic light is entered after being reflected by the specimen. The change in the spectral distribution of the monochromatic light may occur from temperature change of a light source such as an LED that emits the monochromatic light, and the like.

Such a problem may cause a great drawback to a spectral reflection characteristic measuring device 100 as shown in FIG. 15, for example. In the spectral reflection characteristic measuring device 100, white light $L_W$ emitted from a white light source 120 is irradiated on a specimen 110, and light $L_{RW}$ reflected on the surface of the specimen 110 (also referred to as specimen reflected light) is entered to a polychromator 150 through an incident slit 151. In this case, incident light $L_{IN}$ is dispersed by a diffraction grating 152, and the first dispersion image is formed by the primary diffracted light on a light receiving sensor array 153. The light receiving sensor array 153 covers a wavelength band (e.g., 350 to 780 nm) slightly wider than a visible range to be measured. The spectral characteristics of the specimen reflected light $L_{RW}$ is then obtained from the output of the light receiving sensor array 153, and the reflection characteristics such as a spectral reflectivity coefficient of the specimen 110, and the like can be derived from the spectral characteristics of the specimen reflected light $L_{RW}$ and the white light $L_W$.

In the spectral reflection characteristic measuring device 100, when obtaining the wavelength shift amount according to the technique of Japanese Patent Application Laid-Open No. 2005-69784, the monochromatic light (e.g., radiation light in which the wavelength of an ultraviolet LED is about 375 nm) LM emitted from a light source 130 arranged separately from the white light source 120 is irradiated on the specimen 110, and the specimen reflected light LRM is entered to the polychromator 150 through the incident slit 151. In this case, since the wavelength of the monochromatic light LM is in the ultraviolet range, the incident light LIN is dispersed by the diffraction grating 152, but both the first dispersion image (about 375 nm) and the second dispersion image (about 750 nm) are formed on the light receiving sensor array 153. The wavelength shift amount is detected from the formed first dispersion image I1M and the second dispersion image I2M.

However, the shapes of the first dispersion image $I_{1M}$ and the second dispersion image $I_{2M}$ by the monochromatic light $L_M$, that is, the shape of the spectral distribution of the specimen reflected light $L_{RM}$ change depending on the spectral reflection characteristics of the specimen 110. For example, if the specimen 110 is changed from an initial white reference specimen, to a fluorescence brightening paper at the time of specimen measurement, to a yellow printing surface, to a magenta printing surface, and a cyan printing surface, the shape of the spectral distribution of the specimen reflected light $L_{RM}$ changes as shown in FIG. 16. In FIG. 16, the horizontal axis indicates a numerical value (an element number herein) for specifying a position of the array direction of each light receiving element arranged in the light receiving sensor array 153, and the vertical axis indicates a signal intensity corresponding to the intensity of the light. The spectral distribution of the specimen reflected light $L_{RM}$ related to the white reference specimen is drawn with a thick line, the spectral distribution of the specimen reflected light $L_{RM}$ related to the fluorescence brightening paper is drawn with a thin broken line, the spectral distribution of the specimen reflected light $L_{RM}$ related to the yellow printing surface is drawn with a thick broken line, the spectral distribution of the spectral reflected light $L_{RM}$ related to the magenta printing surface is drawn with a thin line, and the spectral distribution of the specimen reflected light $L_{RM}$ related to the cyan printing surface is drawn with a chain dotted line.

When the shapes of the first and second dispersion images $I_{1M}$, $I_{2M}$ change in such a manner from the beginning, the wavelength shift amount from the beginning cannot be accurately obtained. Thus, when obtaining the wavelength shift amount, a cumbersome task of setting a specific specimen such as the white reference specimen, or the like as the specimen 110 is required such that the shape of the spectral distribution of the specimen reflected light $L_{RM}$ becomes constant. For example, the wavelength shift amount is measured with a specific specimen installed as the target to be measured in between the measurements of the reflection characteristics of various specimens at an appropriate frequency, and the spectral reflection characteristic measuring device 100 needs to be corrected according to the wavelength shift amount. The appropriate frequency is, for example, a frequency of an extent the wavelength shift amount that occurs after the correction corresponding to the wavelength shift amount influences only within a range tolerated with respect to the measurement accuracy of the spectral reflection characteristic measuring device 100.

In light of the foregoing, it is an object of the present invention to provide a technique capable of correcting the spectral characteristic measuring device rapidly and with high accuracy regardless of the change in the spectral distribution of the monochromatic light for correction.

Means for Solving the Problems

In order to achieve the above object, a spectral characteristic measuring device according to a first aspect includes a spectrometer and a control device, where the spectrometer includes a light shielding body provided with an opening, a light receiving unit in which a plurality of light receiving elements is arrayed in a direction along one axis and that outputs a signal from each of the light receiving elements according to an irradiation light quantity, and an optical system that disperses the light passed through the opening according to a wavelength to form a dispersion image on the light receiving unit; and the control device includes a storage unit for storing wavelength information indicating a correspondence relationship between the plurality of light receiving elements and wavelengths of pieces of lights irradiated on the plurality of light receiving elements, an intensity distribution acquiring portion for acquiring a first intensity distribution related to a first dispersion image and a second intensity distribution related to a second dispersion image based on the signal outputted from each of the light receiving elements when a monochromatic light is passed through the opening and the first dispersion image related to primary diffracted light and the second dispersion image related to secondary diffracted light are formed on the light receiving unit, a first calculation portion for calculating an estimated intensity distribution related to the second dispersion image from the first intensity distribution according to a predetermined relational expression, a second calculation portion for calculating a change amount related to the wavelength information corresponding to a shift amount between the estimated intensity distribution and the second intensity distribution with respect to a direction along the one axis by a comparison of the estimated intensity distribution and the second intensity distribution while relatively moving at least one of the estimated intensity distribution and the second intensity distribution in a direction along an axis corresponding to a direction along the one axis, and a correction portion for correcting the wavelength information according to the change amount.

A spectral characteristic measuring device according to a second aspect relates to the spectral characteristic measuring device according to the first aspect, where the plurality of light receiving elements include a first light receiving element group to be formed with the first dispersion image and a second light receiving element group to be formed with the second dispersion image; and the predetermined relational expression includes a first portion for calculating a temporary intensity distribution related to the second dispersion image from the first intensity distribution according to an association degree between each intensity component of the first intensity distribution and each intensity component of the second intensity distribution, and a second portion for calculating the estimated intensity distribution from the temporary intensity distribution while reflecting a difference in efficiency from the passing of the light at the opening to the output of the signal by each light receiving element between the first light receiving element group and the second light receiving element group.

A spectral characteristic measuring device according to a third aspect relates to the spectral characteristic measuring device according to the second aspect, where the first portion is a mathematical distribution function, the distribution function is a distribution function in which a first numerical value specifying an array position related to the one axis of each light receiving element included in the first light receiving element group and a second numerical value specifying an array position related to the one axis of each light receiving element included in the second light receiving element group are independent variables, the distribution function being a distribution function with respect to the first numerical value, and a center of the distribution being given by the second numerical value.

A spectral characteristic measuring device according to a fourth aspect relates to the spectral characteristic measuring device according to the third aspect, where the distribution function includes one of Gaussian function and triangular function.

A spectral characteristic measuring device according to a fifth aspect relates to the spectral characteristic measuring device according to any one of second to fourth aspects, where the first calculation portion calculates the estimated intensity distribution from the temporary intensity distribution by the second portion based on a table in which a gain correction coefficient is set with respect to each light receiving element included in the second light receiving element group.

A spectral characteristic measuring device according to a sixth aspect relates to the spectral characteristic measuring device according to any one of first to fifth aspects, where the second calculation portion calculates, as the change amount, a relative movement amount of when a sum of squares of a difference between the estimated intensity distribution and the second intensity distribution becomes a minimum or a value indicating a correlation between the estimated intensity distribution and the second intensity distribution becomes a maximum while relatively moving at least one of the estimated intensity distribution and the second intensity distribution by a predetermined amount in a direction of an axis corresponding to a direction of the one axis.

A spectral characteristic measuring device according to a seventh aspect relates to the spectral characteristic measuring device according to any one of first to fifth aspects, where the second calculation portion calculates, as the change amount, a relative movement amount of when a sum of squares of a difference between the estimated intensity distribution and the second intensity distribution becomes smaller than a threshold value or a correlation coefficient between the estimated intensity distribution and the second intensity distribution becomes greater than a threshold value while relatively moving at least one of the estimated intensity distribution and the second intensity distribution in a direction of an axis corresponding to a direction of the one axis.

A spectral characteristic measuring device according to an eighth aspect relates to the spectral characteristic measuring device according to any one of first to seventh aspects further including a first light source that emits monochromatic light and a second light source that emits measurement light, where the intensity distribution acquiring portion performs first acquisition processing of acquiring the first intensity distribution and the second intensity distribution based on a signal outputted from the light receiving unit when the monochromatic light emitted from the first light source is irradiated on a specimen and a light to be measured from the specimen is passed through the opening and dispersed by the optical system to be irradiated on the light receiving unit, and second acquisition processing of acquiring an intensity distribution for measurement based on the signal outputted from the light receiving unit when the measurement light emitted from the second light source is irradiated on the specimen and a light to be measured from the specimen is passed through the opening and dispersed by the optical system to be irradiated on the light receiving unit.

A spectral characteristic measuring device according to a ninth aspect relates to the spectral characteristic measuring device according to the eighth aspect, where the control device further includes a lighting control portion that controls the first light source and the second light source so that irradiation on the specimen by the monochromatic light emitted from the first light source in the first acquisition processing and irradiation on the specimen by the measurement light emitted from the second light source in the second acquisition processing are carried out within a predetermined period.

A spectral characteristic measuring device according to a tenth aspect relates to the spectral characteristic measuring device according to the eighth or ninth aspect, where the intensity distribution acquiring portion acquires the first intensity distribution and the second intensity distribution based on a plurality of signals related to a plurality of specimens outputted from the light receiving unit when the monochromatic light emitted from the first light source is irradiated on the plurality of specimens in order and the light to be measured from the plurality of specimens are passed through the opening and dispersed by the optical system to be irradiated on the light receiving unit in the first acquisition processing.

A spectral characteristic measuring device according to an eleventh aspect relates to the spectral characteristic measuring device according to the eighth or ninth aspect, where the monochromatic light includes an ultraviolet light, the intensity distribution acquiring portion acquires in the first acquisition processing, the first intensity distribution and the second intensity distribution from a difference between an intensity of a first signal, which is outputted from the light receiving unit when the monochromatic light emitted from the first light source and the measurement light emitted from the second light source are irradiated on the specimen so that a light to be measured from the specimen is passed through the opening, dispersed by the optical system and irradiated on the light receiving unit, and an intensity of a second signal, which is outputted from the light receiving unit when the measurement light emitted from the second light source is irradiated on the specimen so that light to be measured from the specimen is passed through the opening, dispersed by the optical system and irradiated on the light receiving unit; and acquires, in the second acquisition processing, the intensity distribution for measurement from both or one of the intensity of the first signal and the intensity of the second signal.

A spectral characteristic measuring device according to a twelfth aspect relates to the spectral characteristic measuring device according to the eleventh aspect, where the intensity distribution acquiring portion acquires in the first acquisition processing, the first intensity distribution and the second intensity distribution from a difference between integrated intensities of a plurality of first signals related to a plurality of specimens outputted from the light receiving unit when the monochromatic light emitted from the first light source and the measurement light emitted from the second light source are irradiated on the plurality of specimens in order so that the pieces of lights to be measured from the plurality of specimens are passed through the opening, dispersed by the optical system and irradiated on the light receiving unit, and integrated intensities of a plurality of second signals related to the plurality of specimens outputted from the light receiving unit when the measurement light emitted from the second light source is irradiated on the plurality of specimens in order so that the pieces of lights to be measured from the plurality of specimens are passed through the opening, dispersed by the optical system and irradiated on the light receiving unit.

A spectral characteristic measuring device according to a thirteenth aspect relates to the spectral characteristic measuring device according to any one of the first to twelfth aspects, where the control device further includes a setting portion for setting the predetermined relational expression based on the first intensity distribution and the second intensity distribution.

A spectral characteristic measuring device according to a fourteenth aspect relates to the spectral characteristic measuring device according to the thirteenth aspect, where the setting portion sets the predetermined relational expression based on the first intensity distribution and the second intensity distribution acquired by the intensity distribution acquiring portion based on a plurality of signals related to plurality types of reference specimens outputted from the light receiving unit when the monochromatic light emitted from the first light source is irradiated on the plurality types of reference specimens so that pieces of lights to be measured from the plurality types of reference specimens are passed through the opening, dispersed by the optical system, and irradiated on the light receiving unit.

A method for correcting a spectral characteristic measuring device according to a fifteenth aspect is a method for correcting a spectral characteristic measuring device including a spectrometer, the spectrometer including a light shielding body provided with an opening, a light receiving unit in which a plurality of light receiving elements is arrayed in a direction along one axis and that outputs a signal from each of the light receiving elements according to an irradiation light quantity, and an optical system for dispersing the light passed through the opening according to a wavelength to form a dispersion image on the light receiving unit, the method including the steps of storing in a storage unit wavelength information indicating a correspondence relationship between the plurality of light receiving elements and wavelengths of pieces of lights irradiated on the plurality of light receiving elements, acquiring a first intensity distribution related to a first dispersion image and a second intensity distribution related to a second dispersion image by an intensity distribution acquiring portion based on the signal outputted from each of the light receiving elements when a monochromatic light is passed through the opening and the first dispersion image related to a primary diffracted light and the second dispersion image related to a secondary diffracted light are formed on the light receiving unit, calculating by a first calculation portion an estimated intensity distribution related to the second dispersion image from the first intensity distribution according to a predetermined relational expression, calculating by a second calculation portion a change amount related to the wavelength information corresponding to a shift amount between the estimated intensity distribution and the second intensity distribution with respect to a direction along the one axis by a comparison of the estimated intensity distribution and the second intensity distribution while relatively moving at least one of the estimated intensity distribution and the second intensity distribution in a direction along an axis corresponding to a direction along the one axis, and correcting by a correction portion the wavelength information according to the change amount.

A non-transitory computer readable recording medium storing a computer-readable program according to a sixteenth aspect controls a spectral characteristic measuring device to operate as one spectral characteristic measuring device. The one spectral characteristic measuring device comprises a spectrometer and a control device. The spectrometer includes, a light shielding body provided with an opening, a light receiving unit in which a plurality of light receiving elements are arrayed in a direction along one axis and that outputs a signal from each of the light receiving elements according to an irradiation light quantity, and an optical system that disperses the light passed through the opening according to a wavelength to form a dispersion image on the light receiving unit. The control device includes, a storage unit for storing wavelength information indicating a correspondence relationship between the plurality of light receiving elements and wavelengths of piece of lights irradiated on the plurality of light receiving elements, an intensity distribution acquiring portion for acquiring a first intensity distribution related to a first dispersion image and a second intensity distribution related to a second dispersion image based on the signal outputted from each of the light receiving elements when a monochromatic light is passed through the opening and the first dispersion image related to a primary diffracted light and the second dispersion image related to a secondary diffracted light are formed on the light receiving unit, a first calculation portion for calculating an estimated intensity distribution related to the second dispersion image from the first intensity distribution according to a predetermined relational expression, a second calculation portion for calculating a change amount related to the wavelength information the estimated intensity distribution and the second intensity and a correction portion for correcting the wavelength information according to the change amount.

Effects of the Invention

According to the spectral characteristic measuring device of any one of the first to fourteenth aspects, the spectral characteristic measuring device can be corrected rapidly and with high accuracy regardless of the change in the spectral distribution of the monochromatic light for correction.

According to the spectral characteristic measuring device of the second aspect, the predetermined relational expression is separated to a first portion, which indicates the association of the first intensity distribution and the second intensity distribution, and a second portion, which corrects the difference in efficiency, even the difference in efficiency between the first light receiving element group and the second light receiving element group, from the passing of the light at the opening until the output of the signal for every light receiving element, and thus can be easily determined.

According to the spectral characteristic measuring device of the third aspect, the distribution function related to the first portion of the predetermined relational expression can be given easily with sufficient accuracy.

According to the spectral characteristic measuring device of the fourth aspect, the predetermined relational expression can be easily defined since the distribution function related to the first portion of the predetermined relational expression may be given by the center of distribution given by the second numerical value and the half bandwidth.

According to the spectral characteristic measuring device of the fifth aspect, the influence of the difference in the sensitivity of the light receiving element and the diffraction efficiency can be easily corrected.

According to the spectral characteristic measuring device of the sixth and seventh aspects, the shift amount between the estimated intensity distribution and the second intensity distribution can be accurately obtained.

According to the spectral characteristic measuring device of the eighth aspect, the spectral characteristic measuring device can be corrected based on the change amount of the wavelength information obtained using an arbitrary specimen, and thus the measurement of the reference specimen is not necessary and the rapid correction of the spectral characteristic measuring device can be achieved.

According to the spectral characteristic measuring device of the ninth aspect, the measurement accuracy of the spectral characteristics can be improved.

According to the spectral characteristic measuring device of the tenth aspect, the shift amount between the estimated intensity distribution and the second intensity distribution can be accurately obtained since the influence of noise is reduced.

According to the spectral characteristic measuring device of the eleventh aspect, a light source for performing the correction of the spectral characteristic measuring device does not need to be arranged separately from the light source for measuring the spectral characteristics of the specimen, and thus the device can be miniaturized and the manufacturing cost can be reduced. Furthermore, the time required for the measurement of the spectral characteristics including the correction of the spectral characteristic measuring device can be reduced.

According to the spectral characteristic measuring device of the twelfth aspect, the shift amount between the estimated intensity distribution and the second intensity distribution can be accurately obtained since the influence of noise is reduced.

According to the spectral characteristic measuring device of the thirteenth aspect, the predetermined relational expression can be easily obtained.

According to the spectral characteristic measuring device of the fourteenth aspect, the predetermined relational expression can be accurately obtained for a wider wavelength band.

According to the method for correcting the spectral characteristic measuring device of the fifteenth aspect and the non-transitory computer readable recording medium of the sixteenth aspect, effects similar to the spectral characteristic measuring device of the first aspect are obtained.

BRIEF DESCRIPTION OF DRAWINGS

FIG. 3 is a block diagram showing a functional configuration realized by a control unit.

FIG. 4 is a view conceptually showing a relationship between first and second intensity distributions, and an estimated intensity distribution.

FIG. 5 is a view conceptually showing a relationship between first and second intensity distributions, and an estimated intensity distribution.

FIG. 6 is a view conceptually showing a relationship between first and second intensity distributions, and an estimated intensity distribution.

FIG. 7 is a view conceptually showing a relationship between first and second intensity distributions, and an estimated intensity distribution.

FIG. 10 is a view conceptually showing a relationship between first and second intensity distributions, and an estimated intensity distribution.

FIG. 11 is a view conceptually showing a relationship between first and second intensity distributions, and an estimated intensity distribution.

EMBODIMENT FOR CARRYING OUT THE INVENTION

One embodiment of the present invention will be hereinafter described based on the drawings. In the figures, portions having similar configurations and functions are denoted with the same reference numbers, and redundant description will be omitted in the following description. Furthermore, the drawings are schematically illustrated, and the size, positional relationship, and the like of various structures in each figures are not accurately illustrated.

Figure 1:
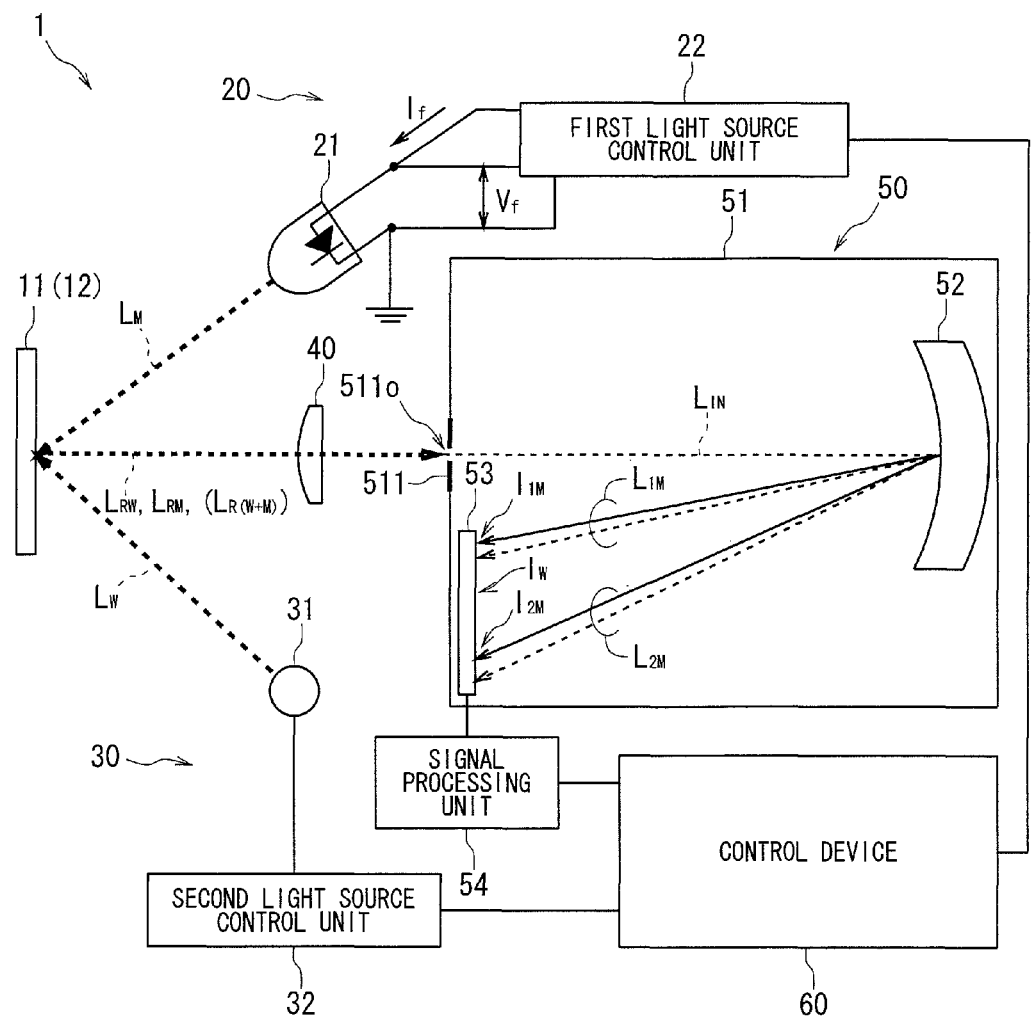
FIG. 1 is a view showing a configuration of a spectral characteristic measuring device according to one embodiment.

(1) Schematic Configuration of Spectral Reflection Characteristic Measuring Device FIG. 1 is a schematic view showing a configuration of a spectral characteristic measuring device 1 according to one embodiment.

As shown in FIG. 1, the spectral characteristic measuring device 1 includes a correction illuminating section 20, a measurement illuminating section 30, a light guiding section 40, a spectrometer 50, and a control device 60. In the spectral characteristic measuring device 1, a specimen 11 which is a reference in performing an initial setting (also referred to as a reference specimen) and a specimen 12 which is a target to be measured (also referred to as a specimen to be measured) can be arranged at predetermined positions. The reference specimen 11 merely needs to be white.

The correction illuminating section 20 includes a first light source 21 and a first light source control unit 22.

The first light source 21 emits light $L_M$ mainly having a component of a narrow constant wavelength range (also referred to as monochromatic light), which is different from white light. The monochromatic light $L_M$ may be visible light or may be ultraviolet light, but needs to have a wavelength at which both first and second dispersion images are detected with the polychromator, to be described later. An example in which the first light source 21 is a light emitting diode that emits ultraviolet light (also referred to as an ultraviolet LED), in which the center of the wavelength (also referred to as a center wavelength) is about 375 nm, will be described.

The first light source control unit 22 controls the light emission of the first light source 21 in response to a signal from the control device 60. Assume here that a constant current $I_f$ is supplied to the first light source 21 by the first light source control unit 22.

The measurement illuminating section 30 includes a second light source 31 and a second light source control unit 32.

The second light source 31 emits light $L_W$ for measuring the spectral characteristics of the specimen to be measured 12 (also referred to as measurement light). The measurement light $L_W$ is, for example, desirably light (also referred to as white light) in which beams of each wavelength are mixed like sunlight. An example in which the measurement light $L_W$ is white light will be described.

The second light source control unit 32 controls the light emission of the second light source 21 in response to a signal from the control device 60.

The light guiding section 40 is an optical system that guides the light $L_{RM}$, $L_{RW}$ emitted from a surface of the reference specimen 11 or the specimen to be measured 12 in a normal direction of the surface to an opening 511o (also referred to as light to be measured) when at least one of the monochromatic light $L_M$ and the measurement light $L_W$ is irradiated on the reference specimen 11 or the specimen to be measured 12. For example, an objective lens can be adopted for such an optical system. The light to be measured $L_{RM}$, $L_{RW}$ merely needs to be light reflected by the surface of the reference specimen 11 or the specimen to be measured 12 (also referred to as reflected light), for example.

The light to be measured $L_{RM}$ may, for example, be reflected light emitted from the surface of the reference specimen 11 or the specimen to be measured 12 if the monochromatic light $L_M$ is ultraviolet light, or may include both the reflected light and fluorescence excited by the ultraviolet light if the specimen to be measured 12 is a fluorescence specimen. In other words, the light to be measured $L_{RM}$ merely needs to contain the reflected light.

Here, the surface of the reference specimen 11 is illuminated by the correction illuminating section 20 from a direction tilted 45° with respect to the normal line of the surface, and the surface of the specimen to be measured 12 is illuminated by the correction illuminating section 20 and the measurement illuminating section 30 from a direction tilted 45° with respect to the normal line of the surface. That is, a so-called 45°:0° geometry is formed. When the monochromatic light $L_M$ is irradiated on the reference specimen 11 or the specimen to be measured 12, the light to be measured $L_{RM}$ emitted from the surface of the reference specimen 11 or the specimen to be measured 12 in the normal direction of the surface may become the monochromatic light mainly having the component of the light of a narrow constant wavelength range.

The spectrometer 50 merely needs to be a so-called polychromator, for example, and includes a light shielding body 51, a dispersion optical system 52, a light receiving unit 53, and a signal processing unit 54. The dispersion optical system 52 and the light receiving unit 53 are arranged in an internal space of the light shielding body 51, for example. The signal processing unit 54 may be arranged outside the light shielding body 51.

The light shielding body 51 merely needs to be a cuboid box that does not transmit light, for example, and includes an open portion 511 provided with an opening 511o. The opening 511o merely needs to be a slit-like opening, for example, but may be a small hole.

The dispersion optical system 52 disperses the light (also referred to as incident light) $L_{IN}$ that entered the internal space of the light shielding body 51 by passing through the opening 511o according to a wavelength. A concave diffraction grating or the like can be adopted for the dispersion optical system 52. The diffraction grating disperses the incident light $L_{IN}$ in one direction (up and down direction in FIG. 1) according to the wavelength. A light image (also referred to as a dispersion image) of the opening 511o thereby is formed on the light receiving unit 53 by the light dispersed by the dispersion optical system 52.

In this case, if the incident light $L_{IN}$ is ultraviolet light or monochromatic light of a purple range, the dispersion image $I_{1M}$ related to primary diffracted light $L_{1M}$ (also referred to as a first dispersion image) and the dispersion image $I_{2M}$ related to secondary diffracted light $L_{2M}$ (also referred to as a second dispersion image) are formed on the light receiving unit 53 by the dispersion optical system 52.

When the white light emitted from the second light source 31 is irradiated and the light to be measured $L_{RW}$ from the specimen to be measured 12 passes through the opening 511o, the light to be measured $L_{RW}$ becomes light corresponding to the spectral reflection characteristics of the specimen to be measured 12. In this case, the incident light $L_{IN}$ is dispersed by the dispersion optical system 52, thereby forming a dispersion image $I_W$ over a wide range on the light receiving unit 53.

The light receiving unit 53 includes a plurality of light receiving elements arrayed in a direction (up and down direction in FIG. 1) along one axis. The direction along the one axis corresponds to the direction in which the incident light $L_{IN}$ is dispersed by the dispersion optical system 52. Assume here that the plurality of light receiving elements are arrayed at a predetermined pitch (also referred to as an element pitch) in the direction along the one axis. Each light receiving element outputs an electric signal corresponding to the light quantity by performing photoelectric conversion according to the irradiation of light. Various types of photoelectric conversion elements such as a photodiode can be adopted for the light receiving element. The electric signal outputted from each light receiving element is a current corresponding to an intensity of the light of the wavelength band corresponding to the light receiving element, and is inputted to the signal processing unit 54. The plurality of light receiving elements of the light receiving unit 53 include part of light receiving elements that may be formed with the first dispersion image $I_{1M}$ of the monochromatic light (also referred to as a first light receiving element group), and part of light receiving elements that may be formed with the second dispersion image $I_{2M}$ (also referred to as a second light receiving element group).

The signal processing unit 54 processes the analog electric signal outputted from the light receiving unit 53 to convert to a digital signal (hereinafter abbreviated as a signal), and outputs to the control device 60.

The control device 60 controls the first light source 21 through the first light source control unit 22, and controls the second light source 31 through the second light source control unit 32 to perform information processing using the signal inputted from the signal processing unit 54. Here, the correction illuminating section 20 performs an operation in which the first light source 21 emits the monochromatic light $L_M$ while supplying a constant current (a constant current) is being maintained (also referred to as a constant current drive). The measurement illuminating section 30 also performs an operation in which the second light source 31 emits the measurement light $L_W$ while supplying a constant current (a constant current) is being maintained (a constant current drive).

(2) Hardware Configuration of Control Device

Figure 2:
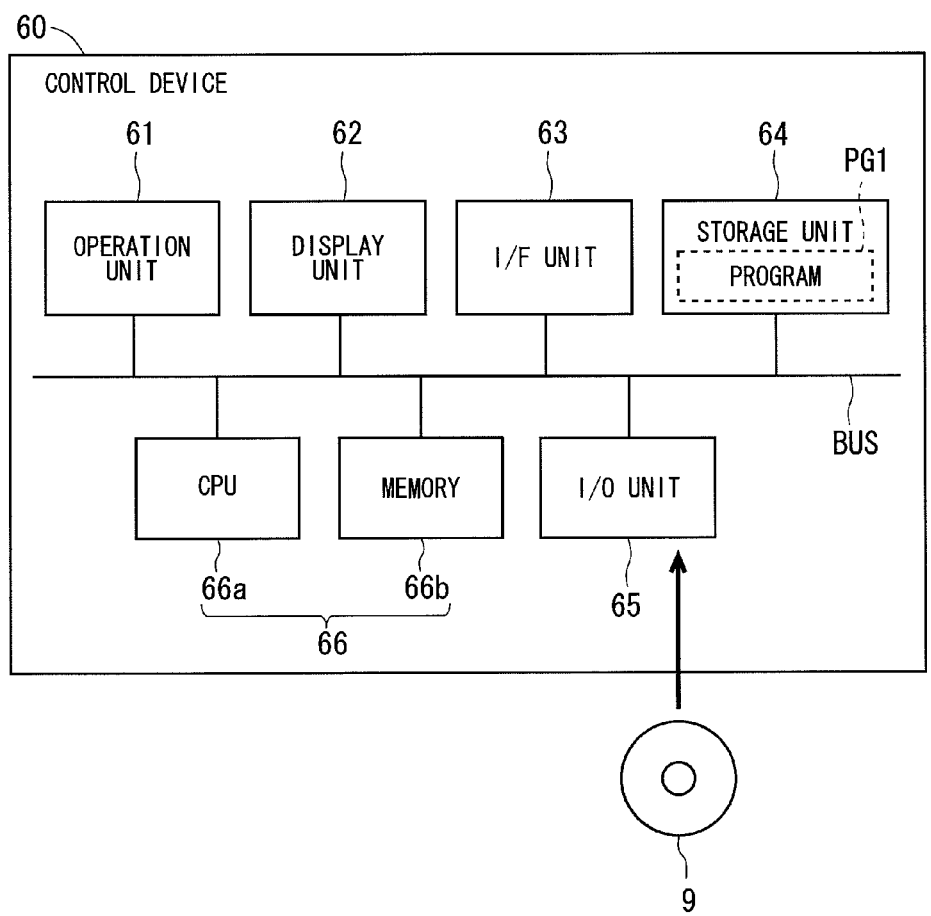
FIG. 2 is a block diagram showing a hardware configuration of a control device.

FIG. 2 is a block diagram showing a hardware configuration of the control device 60.

As shown in FIG. 2, the control device 60 includes an operation unit 61, a display unit 62, an interface (I/F) unit 63, a storage unit 64, an input/output (I/O) unit 65, and a control unit 66, in which the units are connected by a bus to exchange data with each other.

The operation unit 61 includes, for example, a keyboard, a mouse, and the like, and accepts various operations by an operator of the spectral characteristic measuring device 1.

The display unit 62 includes, for example, a liquid crystal display screen, and the like, and displays various information such as setting conditions, operation states, measurement results, and the like of the spectral characteristic measuring device 1.

The I/F unit 63 is connected to the correction illuminating section 20, the measurement illuminating section 30, and the signal processing unit 54 so that data can be transmitted and received by a predetermined communication means. The predetermined communication means includes, for example, wired and wireless communication means, and a dedicated communication cable, or the like, for example, can be adopted for the wired communication means.

The storage unit 64 includes, for example, a hard disc, and the like, and can store a program PG1 for realizing various operations and various functions in the control device 60, as well as various types of information.

The I/O unit 65 is a portion to which a storage medium 9 can be attached and detached. The I/O unit 65 can read out various types of information from the storage medium 9 and transfer to the control unit 66 and the storage unit 64, and can also store the various types of information from the control unit 66 and the storage unit 64 in the storage medium 9.

The control unit 66 includes a central processing unit (CPU) 66a, and a memory 66b. The control unit 66 reads and executes the program PG1 stored in the storage unit 64 to realize various operations and various functions. The various types of information temporarily generated in the various calculation in the CPU 66a are, for example, temporarily stored in the memory 66b.

(3) Functional Configuration of Control Device

FIG. 3 is a block diagram showing a functional configuration realized by executing the program PG1 in the control unit 66.

As shown in FIG. 3, for example, a lighting control portion 661, an intensity distribution acquiring portion 662, a setting portion 663, a first calculation portion 664, a second calculation portion 665, a correction portion 666, a spectral distribution recognizing portion 667, and a spectral reflectivity coefficient calculating portion 668 are realized as functional configurations in the control unit 66. In association with such functional configurations, the storage unit 64 can store initial wavelength information 64a, corrected wavelength information 64b, predetermined relational expression 64c, gain table 64d, calibration information 64e, and measurement result information 64f as various types of information.

The initial wavelength information 64a is, for example, information indicating a correspondence relationship between the plurality of light receiving elements arrayed in the light receiving unit 53, and the wavelengths of pieces of lights irradiated from the dispersion optical system 52 with respect to the plurality of light receiving elements in an initial state such as before shipment of the spectral characteristic measuring device 1, and the like (also referred to as wavelength information). Specifically, in the initial wavelength information 64a, information that specifies the wavelength of the light to be irradiated (also referred to as wavelength specifying information) is associated with information that specifies each light receiving element (also referred to as light receiving element specifying information). The light receiving element specifying information merely needs to be, for example, a number given to each light receiving element in the arraying order of the plurality of light receiving elements (also referred to as an element number). The wavelength specifying information merely needs to be the wavelength of the center of the wavelength band of the light irradiated from the dispersion optical system 52 on the light receiving element (also referred to as a center wavelength). A table in which the center wavelength is corresponded with respect to each element number (also referred to as an initial wavelength information table) may be adopted, or a function indicating a relationship between the element number and the center wavelength may be adopted as a specific example of the initial wavelength information 64a.

The corrected wavelength information 64b is wavelength information of after the wavelength specifying information associated with respect to each light receiving element specifying information is corrected with the initial wavelength information 64a as a base. A table in which the center wavelength is corresponded with respect each element number (also referred to as a corrected wavelength information table) may be adopted, or a function indicating a relationship between the element number and the center wavelength may be adopted as a specific example of the corrected wavelength information 64b.

The calibration information 64e is information indicating a calibration coefficient D0 ($\lambda$) with respect to a wavelength $\lambda$ for a wavelength band in the measurement light $L_W$. The calibration information 64e may be, for example, information in the form of a table, or may be information specified with a function.

The measurement result information 64f includes information indicating the spectral reflectivity coefficient of the specimen to be measured 12 calculated by the spectral reflectivity coefficient calculating portion 668. The predetermined relational expression 64c and the gain table 64d will be described later.

The lighting control portion 661 controls the first light source 21 and the second light source 31. For example, the timing the first light source 21 in the correction illuminating section 20 emits light and the timing the second light source 31 in the measurement illuminating section 30 emits light are controlled by the lighting control portion 661. Specifically, for example, according to the control of the lighting control portion 661, the irradiation of the monochromatic light $L_M$ emitted from the first light source 21 and the irradiation of the measurement light $L_W$ emitted from the second light source 31 with respect to the specimen to be measured 12 are carried out within a predetermined period when the spectral reflection characteristics of the specimen to be measured 12 are measured.

The intensity distribution acquiring portion 662 obtains a signal outputted from the signal processing unit 54 and acquires the intensity of the light received for every light receiving element. The distribution indicating a relationship between the element number and the intensity of light (also referred to as an intensity distribution) is acquired for the light irradiated on the light receiving unit 53. The processing in which the intensity distribution is acquired by the intensity distribution acquiring portion 662 includes a first acquisition processing and a second acquisition processing. In the first acquisition processing, the intensity distribution related to the incident light $L_{IN}$ corresponding to the monochromatic light $L_M$ is acquired. In the second acquisition processing, the intensity distribution related to the incident light $L_{IN}$ corresponding to the measurement light $L_W$ and the spectral characteristics of the specimen to be measured 12 are acquired.

Specifically, in the first acquisition processing, the first dispersion image $I_{1M}$ and the second dispersion image $I_{2M}$ by the light to be measured $L_{RM}$ are formed on the light receiving unit 53. The intensity distribution of the light related to the first dispersion image $I_{1M}$ (also referred to as a first intensity distribution) and the intensity distribution of the light related to the second dispersion image $I_{2M}$ (also referred to as a second intensity distribution) are then acquired based on the signal outputted from the signal processing unit 54. In the second acquisition processing, the dispersion image $I_W$ by the light to be measured $L_{RW}$ corresponding to the measurement light $L_W$ and the spectral reflection characteristics of the specimen to be measured 12 are formed on the light receiving unit 53, and the intensity distribution of the dispersion image $I_W$ for measurement is acquired based on the signal outputted from the signal processing unit 54.

The setting portion 663 performs an initial setting before the shipment of the spectral characteristic measuring device 1, and the like. In the initial setting, the predetermined relational expression 64c and the gain table 64d are set based on the first intensity distribution and the second intensity distribution acquired by the intensity distribution acquiring portion 662. The predetermined relational expression 64c and the gain table 64d thus can be easily obtained.

The first calculation portion 664 calculates the intensity distribution of the light related to the second dispersion image $I_{2M}$ (also referred to as an estimated intensity distribution) from the first intensity distribution according to the predetermined relational expression 64c. The estimated intensity distribution corresponds to the second intensity distribution estimated from the first intensity distribution.

The second calculation portion 665 calculates a wavelength change amount based on the estimated intensity distribution and the second intensity distribution. The wavelength change amount may include, for example, a change amount in which the initial wavelength information 64a is assumed as a reference, and a change amount in which the corrected wavelength information 64b is assumed as a reference. In the present embodiment, an example in which the wavelength change amount is a change amount in which the initial wavelength information 64a is assumed as a reference will be described. In this case, the wavelength change amount is a shift amount from the wavelength (also referred to as a reference wavelength) to become the reference of the wavelength of the light received by each light receiving element (also referred to as a wavelength shift amount or wavelength shift amount).

The correction portion 666 corrects the wavelength information according to the wavelength change amount calculated by the second calculation portion 665 (the wavelength shift amount). The correction of the wavelength information may include, for example, correction of the wavelength information in which the initial wavelength information 64a is assumed as a reference, and correction of the wavelength information in which the corrected wavelength information 64b is assumed as a reference. In the present embodiment, an example in which the correction of the wavelength information is the correction of the wavelength information in which the initial wavelength information 64a is assumed as a reference will be described.

The spectral distribution recognizing portion 667 references the corrected wavelength information 64b to convert the intensity distribution for measurement acquired by the second acquisition processing in the intensity distribution acquiring portion 662 to a distribution $L1(\lambda)$ indicating a relationship between the wavelength and the intensity of light (also referred to as a spectral distribution). Here, $\lambda$ indicates a wavelength.

The spectral reflectivity coefficient calculating portion 668 calculates a spectral reflectivity coefficient $R1(\lambda)$ of the specimen to be measured 12 based on the spectral distribution $L1(\lambda)$ obtained by the spectral distribution recognizing portion 667 and the calibration coefficient $D0(\lambda)$ contained in the calibration information 64e. For example, a fact that the spectral distribution $L1(\lambda)$, the calibration coefficient $D0(\lambda)$, and the spectral reflectivity coefficient $R1(\lambda)$ have a relationship of $R1(\lambda)=L1(\lambda)/D0(\lambda)$ is used.

The calibration coefficient $D0(\lambda)$ of the measurement light may be calculated from the spectral distribution $L0(\lambda)$ obtained by the intensity distribution acquiring portion 662 and the spectral distribution recognizing portion 667 when the measurement light $L_W$ emitted from the second light source 31 is irradiated on the reference specimen 11, which spectral reflectivity coefficient $R0(\lambda)$ is known. For example, a fact that the calibration coefficient $D0(\lambda)$, the spectral distribution $L0(\lambda)$, and the spectral reflectivity coefficient $R0(\lambda)$ have a relationship of $D0(\lambda)=L0(\lambda)/R0(\lambda)$ is used.

(4) Principle Related to Correction of Wavelength Information

First, the positions of the first dispersion image $I_{1M}$ and the second dispersion image $I_{2M}$ formed on the light receiving unit 53 shift by the various changes (deformation, shift of components, etc.) in the spectrometer 50. In this case, the shift amounts of the first dispersion image $I_{1M}$ and the second dispersion image $I_{2M}$ caused by the various changes in the spectrometer 50 are substantially the same. On the contrary, the shift amounts of the first dispersion image $I_{1M}$ and the second dispersion image $I_{2M}$ caused by the change in wavelength in the monochromatic light $L_M$ are not substantially the same, and the shift amount of the second dispersion image $I_{2M}$ is about twice the shift amount of the first dispersion image $I_{1M}$.

As long as there are no various changes in the spectrometer 50, the spectrometer 50 may have a unique relationship between the first intensity distribution related to the first dispersion image $I_{1M}$ and the second intensity distribution related to the second dispersion image $I_{2M}$ if the shift amount is not large. The unique relationship is related to the characteristics of the dispersion optical system 52 and the light receiving unit 53, but if a predetermined relational expression corresponding to the unique relationship can be obtained, the estimated intensity distribution corresponding to the second intensity distribution can be calculated by applying the first intensity distribution to the predetermined relational expression.

FIG. 4 to FIG. 7 are views conceptually showing a relationship between the first intensity distribution and the second intensity distribution obtained in actual measurement, and the estimated intensity distribution calculated based on the first intensity distribution and the predetermined relational expression. In the left half portion of each figure of FIG. 4 to FIG. 7, the first intensity distribution, which is the relationship between an element number j1 of the first light receiving element group on which the first dispersion image $I_{1M}$ may be formed and a signal intensity obtained from the output of each light receiving element is drawn with a solid line. In the right half portion of each figure of FIG. 4 to FIG. 7, the second intensity distribution, which is the relationship between an element number j2 of the second light receiving element group on which the second dispersion image $I_{2M}$ may be formed and a signal intensity obtained from the output of each light receiving element is drawn with a solid line, and the estimated intensity distribution is drawn with a thick broken line.

As shown in FIG. 4, the estimated intensity distribution calculated from the first intensity distribution obtained in the actual measurement is approximate to the second intensity distribution obtained in the actual measurement if the predetermined relational expression is appropriate.

In FIG. 5, a case in which the first intensity distribution shown in FIG. 4 is assumed as the reference and the first intensity distribution is shifted by half the element pitch towards the long wavelength side by the change in the wavelength of the monochromatic light $L_M$ is shown. In this case, the second intensity distribution and the estimated intensity distribution shown in FIG. 4 are assumed as the reference, and both the second intensity distribution and the estimated intensity distribution shift towards the long wavelength side by twice (by one element pitch) the shift amount of the first intensity distribution. Thus, the shift does not occur between the second intensity distribution and the estimated intensity distribution.

In FIG. 6, a case in which the first intensity distribution shown in FIG. 4 is assumed as the reference and the first intensity distribution is shifted by half the element pitch towards the long wavelength side and the attenuation (i.e., inclination) of the distribution on the long wavelength side is gradual by the change in the shape of the spectral distribution in the monochromatic light $L_M$ is shown. In this case, a state in which the second intensity distribution and the estimated intensity distribution are approximate is maintained even if both the position and the shape of the first intensity distribution are changed. Specifically, the second intensity distribution and the estimated intensity distribution shown in FIG. 4 are assumed as the reference, both the second intensity distribution and the estimated intensity distribution are shifted by twice the shift amount of the first intensity distribution towards the long wavelength side, and the position of each intensity in both the second intensity distribution and the estimated intensity distribution is shifted by one element pitch towards the long wavelength side.

As shown in FIG. 4 to FIG. 6, when the change of the first intensity distribution caused by either one of or both the shift in wavelength and the change in shape in the spectral distribution of the monochromatic light $L_M$ occurs, the state in which the second intensity distribution and the estimated intensity distribution are approximate is maintained.

On the contrary, as shown in FIG. 7, when the first intensity distribution shifts as a result of thermal change and temporal change caused by heat generation of the second light source 31, and the like in the spectrometer 50, the state in which the second intensity distribution and the estimated intensity distribution are approximate is not maintained. For example, when the wavelength of the monochromatic light $L_M$ shifts by half the element pitch towards the long wavelength side, the second intensity distribution shifts by half the element pitch, which is the same amount as the shift amount of the first intensity distribution, towards the long wavelength side but the estimated intensity distribution shifts by twice (by one element pitch) the shift amount of the first intensity distribution towards the long wavelength side. In other words, in the predetermined relational expression, the change in the first intensity distribution caused by the change in the spectrometer 50 is handled as the change in the first intensity distribution caused by the change in the spectral distribution of the monochromatic light $L_M$, and the estimated intensity distribution is shifted. As a result, the shift occurs between the second intensity distribution and the estimated intensity distribution. However, the state in which the shape of the second intensity distribution and the shape of the estimated intensity distribution are approximate is maintained.

The shift amount between the second intensity distribution and the estimated intensity distribution is equal to the shift amount (the wavelength shift amount) caused by the change in the spectrometer 50, and can be obtained with high accuracy by the comparison of the second intensity distribution and the estimated intensity distribution, which have approximate shapes.

When the monochromatic light $L_M$ is irradiated on the specimen to be measured 12 and the reflected light $L_{RM}$ from the specimen to be measured 12 passes through the opening 511o, the spectral distribution of the incident light $L_{IN}$ may change depending on the spectral reflection characteristics of the specimen to be measured 12. In this case as well, the shapes of the distributions are approximate between the second intensity distribution obtained in the actual measurement and the estimated intensity distribution obtained through calculation. If the shift occurs between the second intensity distribution and the estimated intensity distribution, the shift is caused by the change in the spectrometer 50 and the wavelength information is corrected according to the shift.

The shift between the second intensity distribution and the estimated intensity distribution changes from the time of initial setting in which the reference specimen 11 is used to the time of measurement of the spectral characteristics related to the specimen to be measured 12. The change in the shift amount from the time of initial setting to the time of measurement becomes the shift amount (the wavelength shift amount) from the reference wavelength of the wavelength of the light received by each light receiving element.

In the spectral characteristic measuring device 1 according to the present embodiment, the wavelength information is corrected based on the wavelength shift amount obtained by the comparison of the second intensity distribution and the estimated intensity distribution. Thus, the spectral characteristic measuring device 1 can be rapidly and easily corrected regardless of the change in the spectral distribution of the monochromatic light $L_M$ for correction.

Hereinafter, the predetermined relational expression indicating the relationship between the first intensity distribution and the second intensity distribution, the determination method of the predetermined relational expression, the correction method of the wavelength information at the time of measurement, and the operation of the spectral characteristic measuring device 1 will be described in order.

(5) Predetermined Relational Expression Indicating Relationship Between First Intensity Distribution and Second Intensity Distribution In the spectrometer 50, the primary light and the secondary light are generated by the diffraction phenomenon in the dispersion optical system 52 based on one incident light $L_{IN}$. That is, the secondary light irradiated on each light receiving element of the second light receiving element group formed with the second dispersion image corresponds to the primary light irradiated on each light receiving element of the first light receiving element group formed with the first dispersion image. That is, each intensity component of the first intensity distribution and each intensity component of the second intensity distribution are related.

Thus, the signal intensity obtained from each light receiving element of the first light receiving element group may be assumed as contributing apparently to the signal intensity obtained from each light receiving element of the second light receiving element group. The degree at which the signal intensity related to each light receiving element of the first light receiving element group contributes with respect to the signal intensity related to each light receiving element of the second light receiving element group (also referred to as a contribution degree) can be given by a matrix (also referred to as a contribution degree matrix). The contribution degree matrix corresponds to that indicating an association degree between each intensity component of the first intensity distribution and each intensity component of the second intensity distribution.

In this case, assume the first intensity distribution and the second intensity distribution which are respectively shown with a column vector, and the contribution degree matrix in which the element number j1 of the first light receiving element group corresponds to the column number, and the element number j2 of the second light receiving element group corresponds to the row number. If j1=0~(J1−1) and j2=0~(J2−1), the contribution degree matrix becomes a matrix of J2×J1.

The predetermined relational expression indicating the relationship between a signal intensity $A1_{j1}$ related to each light receiving element of the first light receiving element group and a signal intensity $A12_{j2}$ of the estimated intensity distribution related to each light receiving element of the second light receiving element group is indicated with equation (1) by the contribution degree matrix ($C_{j2,j1}$) and the gain correction column vector ($K_{j2}$). In equation (1), the signal intensity $A1_{j1}$ and the signal intensity $A12_{j2}$ are indicated in a form of the column vector ($A1_{j1}$) having the signal intensity $A1_{j1}$ as an element and the column vector ($A12_{j2}$) having the signal intensity $A12_{j2}$ as an element.

[Equation 1]

$$(A12_{j2}) = (K_{j2})(C_{j2,j1})(A1_{j1}) \quad (1)$$

In the contribution degree matrix ($C_{j2,\,j1}$), the element of the j2th row indicates the contribution degree of the signal intensity $A1_{j1}$ related to the j1th light receiving element of the first light receiving element group with respect to the signal intensity $A12_{j2}$ related to the j2th light receiving element of the second light receiving element group. In other words, the element of the j2th row indicates the association degree between the signal intensity $A12_{j2}$ and the signal intensity $A1_{j1}$.

The gain correction column vector ($K_{j2}$) is a column vector having a gain correction coefficient $K_{j2}$ for every light receiving element in the second light receiving element group as the element. The gain correction column vector ($K_{j2}$) corrects the difference of the efficiency when the signal intensity $A1_{j1}$ is obtained in each light receiving element of the first light receiving element group and the efficiency when the signal intensity $A2_{j2}$ is obtained in each light receiving element of the second light receiving element group with respect to the same incident light $L_{IN}$. The difference in efficiency may include the difference in spectral sensitivity of each light receiving element between the first light receiving element group and the second light receiving element group of the light receiving unit 53, and the difference in intensity between the primary diffracted light and the secondary diffracted light generated in the dispersion optical system 52 from the incident light $L_{IN}$ of the same monochromatic light.

Thus, the predetermined relational expression includes a first portion for calculating a temporary intensity distribution related to the second dispersion image by the contribution degree matrix ($C_{j2,\,j1}$) from the first intensity distribution, and a second portion for calculating the estimated intensity distribution of the second dispersion image from the temporary intensity distribution by reflecting the difference in efficiency.

In relation to the contribution degree matrix ($C_{j2,\,j1}$), the contribution degree is not greatly different among the light receiving elements of the second light receiving element group in a limited range of the light receiving element where the first dispersion image $I_{1M}$ and the second dispersion image $I_{2M}$ generated based on the monochromatic light related to a specific wavelength in the spectrometer 50 are formed. Thus, the contribution degree related to each light receiving element of the second light receiving element group can be approximated with a mathematical distribution function that draws same type of shapes even if the element number (may not be integer) to become the center differs. That is, the first portion can correspond to the distribution function.

More specifically, in such a distribution function, a first numerical value (element number herein) that specifies the array position of each light receiving element included in the first light receiving element group, and a second numerical value (element number herein) that specifies the array position of each light receiving element included in the second light receiving element group are independent variables. The distribution function is the distribution function with respect to the first numerical value, and the center of the distribution is given by the second numerical value. A function related to the first portion of the predetermined relational expression can be easily given with sufficient accuracy by adopting such a distribution function.

The Gaussian function, a triangular function, and the like, in which the shape is defined by a number of constants and the center is given by a second variable (element number) can be adopted for the distribution function that can approximately express the contribution degree. Other functions such as a trapezoidal function, Lorentz function, and the like may be adopted as a function that can approximately express the contribution degree. However, the Gaussian function, the triangular function, and the like can be easily defined under a few conditions such as the element number to become the center and the half bandwidth. Thus, if the Gaussian function and the triangular function are adopted for the function that can approximately express the contribution degree, the amount of information and calculation required for determining the predetermined relational expression, to be described later, can be reduced.

For example, if the Gaussian function is adopted for the function that can approximately express the contribution degree, each element $C_{j2,\,j1}$ of the contribution degree matrix ($C_{j2,\,j1}$) is indicated with equation (2).

[Equation 2]

$$C_{j2,j1} = G(j1, j2, g, a, d, dw) \\ = g \cdot \exp\left[-\left\{\frac{j1 - a \cdot j2 + d}{dw/(2\ln 2)}\right\}^2\right] \quad (2)$$

In equation (2), a numerical value a is a value obtained by dividing a displacement of the first dispersion image in the first light receiving element group corresponding to a displacement of the second dispersion image in the second light receiving element group by the displacement. The numerical value a is constant at 0.5, in principle, but may slightly shift from 0.5 by the dispersion optical system 52, and the like of the spectrometer 50. A numerical value g is a constant that gives a height of a peak of the intensity distribution. A numerical value d is a numerical value that gives an offset for a position (e.g., position of center of second dispersion image) where the second dispersion image is formed. A numerical value dw is a constant that gives a half bandwidth.

The four numerical values a, g, d, dw are values unique to the spectrometer 50 (also referred to as a unique value). The numerical values a, g, dw normally do not change, but the numerical value d may change by the shift amount (a wavelength shift amount) caused by the change in the spectrometer 50.

On the left side of FIG. 4, the element $C_{4,j1}$ given by equation (2) is drawn with a chain dotted line with respect to the light receiving element in which the element number j2 of the second light receiving element group is four. Here, when the signal intensity $A12_{j2}$ is calculated for the light receiving element in which the element number j2 is four, the signal intensities $A1_2, A1_3, A1_4$ related to the light receiving elements having the element number j1 of the first light receiving element group of 2, 3, 4 contribute according to the contribution degrees $C_{4,2}, C_{4,3}, C_{4,4}$.

The contribution degree matrix $(C_{j2,j1})$ and the gain correction column vector $(K_{j2})$ defining the predetermined relational expression can be obtained for the individual spectral characteristic measuring device 1 at the time of manufacturing before the shipment of the spectral characteristic measuring device 1, and the like.

The predetermined relational expression indicated with equation (1) represents a relationship unique to the spectrometer 50 between the light receiving element having the element number j1 in the first light receiving element group and the light receiving element having the element number j2 in the second light receiving element group. The predetermined relational expression does not depend on the shape of the intensity distribution, that is, the spectral distribution of the light image formed on the first light receiving element group. Thus, even if the first intensity distribution related to the first dispersion image is changed, the estimated intensity distribution related to the second dispersion image having close resemblance to the second intensity distribution related to the second dispersion image obtained by the actual measurement can be calculated by the predetermined relational expression of equation (1).

FIG. 8 to FIG. 12 are views showing a relationship between the first intensity distribution and the second intensity distribution obtained in the actual measurement for the reflected light of various specimens, and the estimated intensity distribution calculated based on the first intensity distribution and the predetermined relational expression. The ultraviolet light having the center wavelength of about 375 nm is irradiated on each specimen as the monochromatic light $L_M$. However, for the first intensity distribution, the signal intensity is corrected to 1/10 and shown so as to be easily seen.

Figure 8:
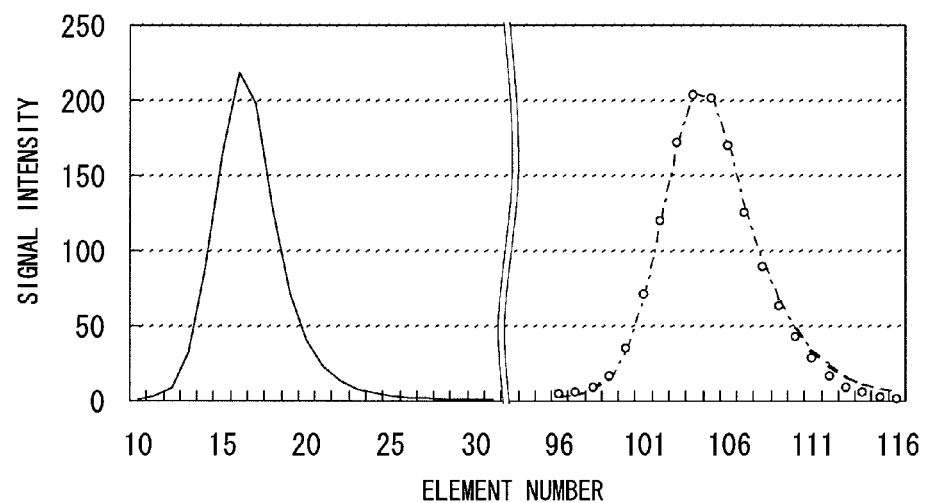
FIG. 8 is a view conceptually showing a relationship between first and second intensity distributions, and an estimated intensity distribution.
Figure 9:
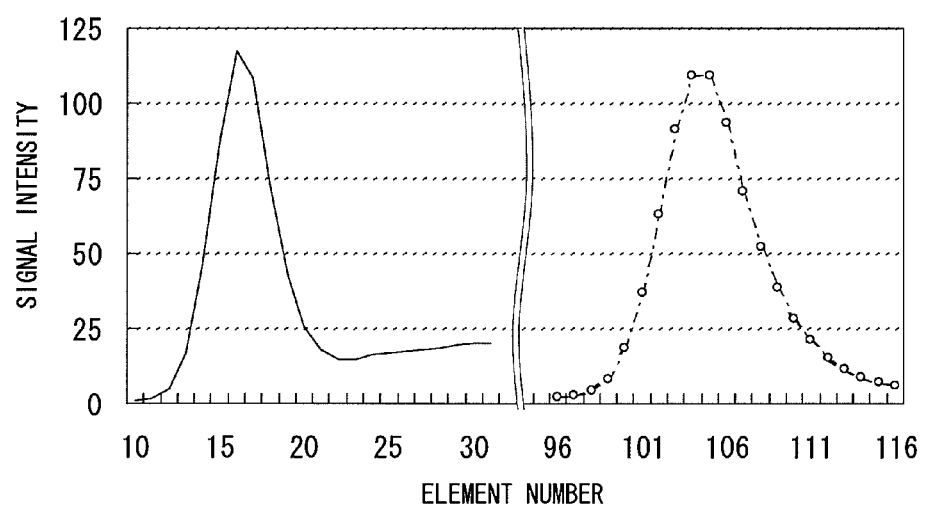
FIG. 9 is a view conceptually showing a relationship between first and second intensity distributions, and an estimated intensity distribution.
Figure 12:
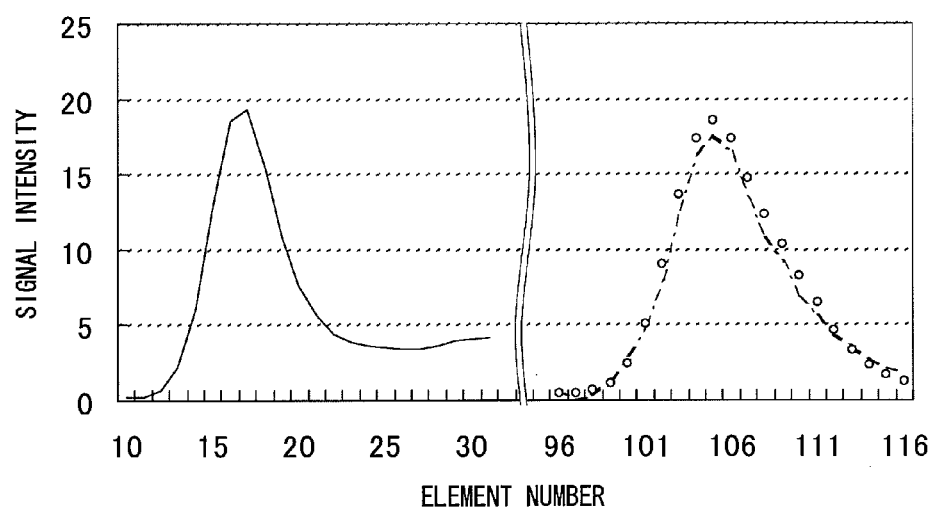
FIG. 12 is a view conceptually showing a relationship between first and second intensity distributions, and an estimated intensity distribution.

In FIG. 8, a relationship of when the specimen is a white reference surface is shown. In FIG. 9, a relationship of when the specimen is a fluorescence brightening base material is shown. In FIG. 10, a relationship of when the specimen is a yellow printing surface of the fluorescence brightening base material is shown. In FIG. 11, a relationship of when the specimen is a blue printing surface is shown. In FIG. 12, a relationship of when the specimen is a black printing surface is shown.

Specifically, in the left half portion of each figure of FIG. 8 to FIG. 12, the first intensity distribution, which is the relationship between an element number of the first light receiving element group on which the first dispersion image $I_{1M}$ may be formed and the signal intensity related to the signal outputted from each light receiving element is drawn with a solid line. In the right half portion of each figure of FIG. 8 to FIG. 12, the second intensity distribution, which is the relationship between an element number of the second light receiving element group on which the second dispersion image $I_{2M}$ may be formed and the signal intensity related to the signal outputted from each light receiving element is drawn with a chain dotted line, and the estimated intensity distribution is drawn with an outlined circle.

As shown in FIG. 8 to FIG. 12, the first intensity distribution obtained by the actual measurement changes by the reflection characteristics of the reference specimen 11, but the estimated intensity distribution calculated based on the first intensity distribution closely resembles the second intensity distribution obtained by the actual measurement.

(6) Determination Method of Predetermined Relational Expression

As described above, the predetermined relational expression shown in equation (1) is defined by the contribution degree matrix $(C_{j2,j1})$ in which the elements $C_{j2,j1}$ are given by the Gaussian function of equation (2) and the gain correction column vector $(K_{j2})$. The predetermined relational expression is, for example, determined in the initial setting for the individual spectral characteristic measuring device 1 at the time of manufacturing before the shipment of the spectral characteristic measuring device 1.

Hereinafter, a method for determining a predetermined relational expression in the initial setting by the setting portion 663 will be described using a specific example.

First, when the monochromatic light $L_M$ emitted from the first light source 21 is irradiated on the reference specimen 11, the light to be measured $L_{RM}$ enters the spectrometer 50 through the opening 511o. The incident light $L_{IN}$ is then dispersed by the diffraction grating of the dispersion optical system 52, and the first dispersion image $I_{1M}$ is formed by the primary diffracted light $L_{1M}$ and the second dispersion image $I_{2M}$ is formed by the secondary diffracted light $L_{2M}$ on the light receiving unit 53. In this case, the signal intensity $A1_{j1}$, which is the element of the first intensity distribution related to the first dispersion image $I_{1M}$, and the signal intensity $A2_{j2}$, which is the element of the second intensity distribution related to the second dispersion image $I_{2M}$ are acquired by the signal processing unit 54 and the intensity distribution acquiring portion 662 from the signal outputted from the light receiving unit 53.

In the first calculation portion 664, the column vector $(A1_{j1})$ having the signal intensity $A1_{j1}$ as the element and the contribution degree matrix $(C_{j2,j1})$ are used to calculate the signal intensity $A120_{j2}$ corresponding to the element of the estimated intensity distribution according to equation (3).

[Equation 3]

$$(A120_{j2}) = (C_{j2,j1})(A1_{j1}) \quad (3)$$

In this case, the four numerical values a, g, d, dw of the Gaussian function that provide the elements $C_{j2,j1}$ of the contribution degree matrix $(C_{j2,j1})$ are adjusted such that the signal intensity $A120_{j2}$ approaches the signal intensity $A2_{j2}$ as much as possible while the signal intensity $A120_{j2}$ and the signal intensity $A2_{j2}$ are compared by the setting portion 663. The four numerical values a, g, d, dw of when the signal intensity $A120_{j2}$ approaches the signal intensity $A2_{j2}$ as much as possible are set as unique values a1, g1, d1, dw1 of the spectrometer 50 by the setting portion 663.

The comparison of the signal intensity $A120_{j2}$ and the signal intensity $A2_{j2}$ is carried out, for example, for a predetermined range related to the element number j2 including the peak of the signal intensity $A2_{j2}$. A numerical value range in which the element number j2 is between 100 and 110 of FIG. 8 can be adopted, for example, for the predetermined range.

Specifically, for example, a total sum of squares (also referred to as a sum of squares) E of the difference between the signal intensity $A120_{j2}$ and the signal intensity $A2_{j2}$ in each element number j2 calculated according to equation (4) is calculated as a value for evaluating the degree of approximation between the signal intensity $A120_{j2}$ and the signal intensity $A2_{j2}$ (also referred to as an approximate evaluation value) for the predetermined range. When the sum of squares E becomes smaller than a predetermined threshold value Et, determination may be made that the signal intensity $A120_{j2}$ approaches the signal intensity $A2_{j2}$.

[Equation 4]

$$E = \Sigma_{j2}(A120_{j2} - A2_{j2})^2 \qquad (4)$$

The approximate evaluation value is not limited to the sum of squares E, and may be an inverse number of the sum of squares E, for example. In this case, determination may be made that the signal intensity $A120_{j2}$ approaches to the signal intensity $A2_{j2}$ the most when the approximate evaluation value becomes a maximum. Thus, the approximate evaluation value merely needs to be a value indicating the correlation between the signal intensity $A120_{j2}$ and the signal intensity $A2_{j2}$. A calculation for performing optimization using the least squares method may be adopted for the calculation of approaching the signal intensity $A120_{j2}$ to the signal intensity $A2_{j2}$.

The contribution degree matrix $(C_{j2, j1})$ is determined by applying the set unique values a1, g1, d1, dw1 of the spectrometer 50 to the numerical values a, g, d, dw of the Gaussian function of equation (2).

Furthermore, as shown in equation (5), the ratio of the signal intensity $A2_{j2}$ obtained in the actual measurement and the signal intensity $A120_{j2}$ calculated by equation (3) to which the determined initial contribution degree matrix $(C_{j2, j1})$ is applied is calculated as the element $K_{j2}$ of the gain correction column vector $(K_{j2})$.

[Equation 5]

$$K_{j2} = \frac{A2_{j2}}{A120_{j2}} \qquad (5)$$

The contribution degree matrix $(C_{j2, j1})$ and the gain correction column vector $(K_{j2})$ obtained by the above calculations are stored in the storage unit 64 to determine the predetermined relational expression.

The information of the predetermined relational expression shown in equation (1) can be stored in the storage unit 64 as the predetermined relational expression 64c with the unique values a1, g1, d1, dw1 defining the Gaussian function. The gain correction coefficient $K_{j2}$, which is the element of the gain correction column vector $(K_{j2})$ is set with respect to each light receiving element included in the second light receiving element group, and can be stored as the gain table 64d. In this case, for example, the gain table 64d is a table in which the gain correction coefficient $K_{j2}$ is associated with respect to the element number j2 of each light receiving element included in the second light receiving element group.

(7) Correction Method of Wavelength Information in Measurement

Hereinafter, the correction method of the wavelength information when the spectral characteristics of the specimen to be measured 12 are measured will be described.

First, when the monochromatic light $L_M$ emitted from the first light source 21 is irradiated on the specimen to be measured 12, the light to be measured $L_{RM}$ enters the spectrometer 50 through the opening 511o. The incident light $L_{IN}$ is then dispersed by the diffraction grating of the dispersion optical system 52, and the first dispersion image $I_{1M}$ is formed by the primary diffracted light $L_{1M}$ and the second dispersion image $I_{2M}$ is formed by the secondary diffracted light $L_{2M}$ on the light receiving unit 53. In this case, the signal intensity $A1_{j1}$, which is the element of the first intensity distribution related to the first dispersion image $I_{1M}$, and the signal intensity $A2_{j2}$, which is the element of the second intensity distribution related to the second dispersion image $I_{2M}$ are acquired by the signal processing unit 54 and the intensity distribution acquiring portion 662 from the signal outputted from the light receiving unit 53.

In the first calculation portion 664, the column vector $(A1_{j1})$ having the signal intensity $A1_{j1}$ as the element, the contribution degree matrix $(C_{j2, j1})$ stored in the storage unit 64, and the gain correction column vector $(K_{j2})$ based on the gain table 64d stored in the storage unit 64 are applied to equation (1). The column vector $(A12_{j1})$ having the signal intensity $A12_{j2}$ as the element is thereby calculated. The column vector $(A12_{j1})$ corresponds to the estimated intensity distribution. The influence of the sensitivity of the light receiving element and the difference in the diffraction efficiency can be easily corrected by applying the gain correction column vector $(K_{j2})$ based on the gain table 64d.

In the second calculation portion 665, the numerical value d of the Gaussian function that provides the elements $C_{j2, j1}$ of the contribution degree matrix $(C_{j2, j1})$ is adjusted so that the signal intensity $A12_{j2}$ approaches the signal intensity $A2_{j2}$ as much as possible while comparing the signal intensity $A12_{j2}$ and the signal intensity $A2_{j2}$ obtained in the actual measurement.

The comparison of the signal intensity $A12_{j2}$ and the signal intensity $A2_{j2}$ is carried out, for example, for a predetermined range related to the element number j2 including the peak of the signal intensity $A2_{j2}$. In this case, the comparison of the signal intensity $A12_{j2}$ and the signal intensity $A2_{j2}$ is carried out while the estimated intensity distribution having the signal element $A12_{j2}$ as the element is moved in the direction of the axis of the element number according to the change in the numerical value d. For example, the signal intensity $A12_{j2}$ and the signal intensity $A2_{j2}$ may be compared while at least one of the estimated intensity distribution having the signal intensity $A12_{j2}$ as the element and the second intensity distribution having the signal intensity $A2_{j2}$ as the element is relatively moved in the direction of the axis of the element number. In this case, the relative movement amount corresponds to the change amount of the numerical value d.

Specifically, for example, a total sum of squares (also referred to as a sum of squares) E of the difference between the signal intensity $A12_{j2}$ and the signal intensity $A2_{j2}$ in each element number j2 calculated according to equation (6) is calculated as a value for evaluating the degree of approximation between the signal intensity $A12_{j2}$ and the signal intensity $A2_{j2}$ (also referred to as an approximate evaluation value) for the predetermined range. When the sum of squares E becomes smaller than a predetermined threshold value Et, determination may be made that the signal intensity $A12_{j2}$ is approximate to the signal intensity $A2_{j2}$.

[Equation 6]

$$E = \Sigma_{j2}(A12_{j2} - A2_{j2})^2 \qquad (6)$$

In this method, the distribution shape of the predetermined range is compared, and hence an optimum numerical value d is obtained with higher accuracy than the method of comparing the centroid of each distribution.

The approximate evaluation value is not limited to the sum of squares E, and for example, may be a correlation coefficient of the signal intensity $A12_{j2}$ and the signal intensity $A2_{j2}$. In this case, determination may be made that the signal intensity $A12_{j2}$ is approximate the most to the signal intensity $A2_{j2}$ when the approximate evaluation value becomes greater than the predetermined threshold value. A calculation for performing optimization using the least squares method may be adopted for the calculation of approximating the signal intensity $A12_{j2}$ to the signal intensity $A2_{j2}$.

In the second calculation portion 665, the change amount $\Delta d$ from the initial unique value d1 to the numerical value d of when the signal intensity $A12_{j2}$ is approximate to the signal intensity $A2_{j2}$ is calculated with respect to the numerical value d. In the second calculation portion 665, the change amount $\Delta d$ is converted to the wavelength of the light based on the initial wavelength information 64a, so that the change amount (the wavelength shift amount) related to the wavelength information from the time of initial setting caused by the change in the spectrometer 50 is calculated. The wavelength shift amount corresponds to the shift amount between the estimated intensity distribution and the second intensity distribution, and can be accurately obtained as the relative movement amount of the estimated intensity distribution and the second intensity distribution along the axis of the element number when the signal intensity $A12_{j2}$ and the signal intensity $A2_{j2}$ are compared.

In the correction portion 666, the wavelength information is corrected according to the wavelength shift amount calculated by the second calculation portion 665. For example, the corrected wavelength information 64b in which the wavelength shift amount calculated by the second calculation portion 665 is uniformly reflected with respect to the initial wavelength information 64a is generated, and stored in the storage unit 64. The correction of the spectral characteristic measuring device 1 corresponding to the wavelength shift amount is completed by the generation of the corrected wavelength information 64b.

(8) Operation of Spectral Characteristic Measuring Device

<(8-1) Determination Operation Flow of Predetermined Relational Expression in Initial Setting>

Figure 13:
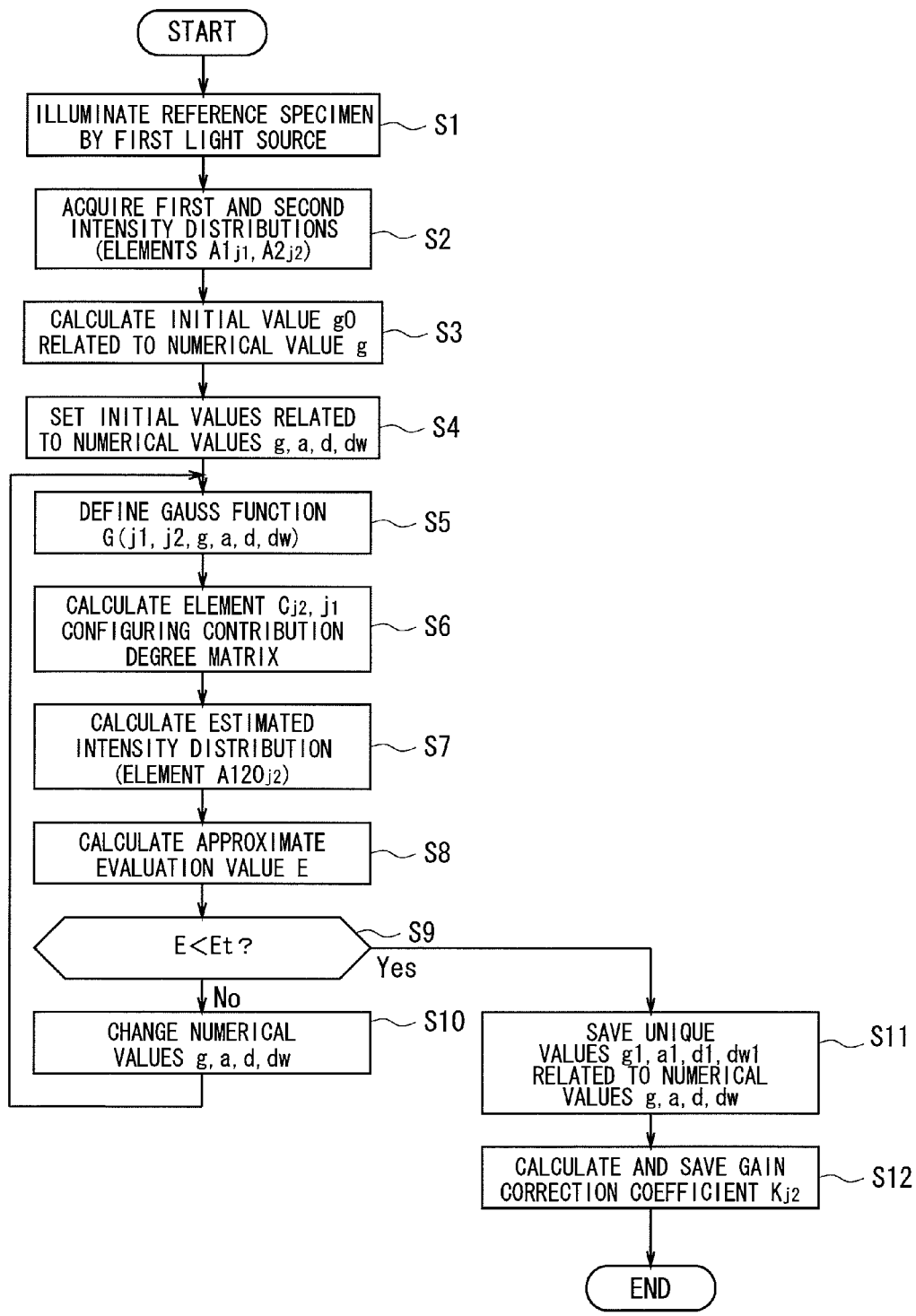
FIG. 13 is a flowchart showing an operation flow of an initial setting of a spectral characteristic measuring device.

FIG. 13 is a flowchart showing an operation flow of an initial setting in the spectral characteristic measuring device 1. This operation flow is executed by the control of the control device 60. For example, the operation flow starts in response to the operation of the operation unit 61 by the operator with the reference specimen 11 arranged in the spectral characteristic measuring device 1, and the process proceeds to step S1.

In step S1, the reference specimen 11 is illuminated by the correction illuminating section 20. Specifically, the first light source 21 is turned ON, and the monochromatic light $L_M$ emitted from the first light source 21 is irradiated on the reference specimen 11. In this case, the light to be measured $L_{RM}$ enters the spectrometer 50 through the opening 511o. The incident light $L_{IN}$ is then dispersed by the diffraction grating of the dispersion optical system 52, and the first dispersion image $I_{1M}$ is formed by the primary diffracted light $L_{1M}$ and the second dispersion image $I_{2M}$ is formed by the secondary diffracted light $L_{2M}$ on the light receiving unit 53.

In step S2, the signal intensity $A1_{j1}$, which is the element of the first intensity distribution related to the first dispersion image $I_{1M}$, and the signal intensity $A2_{j2}$, which is the element of the second intensity distribution related to the second dispersion image $I_{2M}$ are acquired from the signal outputted from the light receiving unit 53 by the signal processing unit 54 and the intensity distribution acquiring portion 662. Thereafter, the first light source 21 is turned OFF.

In step S3, an initial value g0 of the numerical value g of the Gaussian function shown in equation (2) is calculated by the setting portion 663. A maximum value $A2_{j2MAX}$ of the signal intensity $A2_{j2}$ is divided by a maximum value $A1_{j1MAX}$ of the signal intensity $A1_{j1}$ based on the signal intensity $A1_{j1}$ and the signal intensity $A2_{j2}$ obtained in step S2 to calculate an initial value g0 ($=A2_{j2MAX}/A1_{j1MAX}$).

In step S4, initial values are set with respect to the four numerical values a, g, d, dw of the Gaussian function shown in equation (2) by the setting portion 663. For example, the initial value of the numerical value g is set to g0 calculated in step S3, the initial value of the numerical value a is set to 0.5, the initial value of the numerical value d is set to 0, and the initial value of the numerical value dw is set to 1.

In step S5, the Gaussian function shown in equation (2) is defined by the setting portion 663. First, when the process proceeds from step S4 to step S5, the initial values of the four numerical values a, g, d, dw set in step S4 are substituted to equation (2) to define the Gaussian function. When the process proceeds from step S10 to step S5, the four numerical values a, g, d, dw changed in step S10 are substituted to equation (2) to define the Gaussian function.

In step S6, the elements $C_{j2,j1}$ of the contribution degree matrix $(C_{j2,j1})$ are calculated according to the Gaussian function defined in step S5 by the setting portion 663.

In step S7, the column vector $(A1_{j1})$ having the signal intensity $A1_{j1}$ as the element and the contribution degree matrix $(C_{j2,j1})$ including the elements $C_{j2,j1}$ calculated in step S6 are applied to equation (3) by the first calculation portion 664 to calculate the estimated intensity distribution having the signal intensity $A120_{j2}$ as the element.

In step S8, a total sum of squares (a sum of squares) E of the difference between the signal intensity $A120_{j2}$ and the signal intensity $A2_{j2}$ in each element number j2 is calculated as the approximate evaluation value according to equation (4) by the setting portion 663.

In step S9, whether the sum of squares E calculated recently in step S8 is smaller than the predetermined threshold value Et is determined by the setting portion 663. the process proceeds to step S10 if the sum of squares E is not smaller than the predetermined threshold value Et, and the process proceeds to step S11 if the sum of squares E is smaller than the predetermined threshold value Et.

In step S10, the four numerical values a, g, d, dw are corrected by the setting portion 663, and the process proceeds to step S5. The processing of steps S5 to S10 are repeated until the sum of squares E becomes smaller than the predetermined threshold value Et.

In step S11, determination is made that the four numerical values a, g, d, dw are sufficiently optimized, and the four numerical values a, g, d, dw are set as the unique values a1, g1, d1, dw1 of the spectrometer 50 by the setting portion 663. The contribution degree matrix $(C_{j2,j1})$ is thereby determined. The unique values a1, g1, d1, dw1 defining the Gaussian function and the determined contribution degree matrix $(C_{j2,j1})$ are stored in the storage unit 64 as the predetermined relational expression 64c.

In step S12, the signal intensity $A2_{j2}$ obtained in the actual measurement is divided by the signal intensity $A120_{j2}$ calculated by equation (3) applied with the contribution degree matrix $(C_{j2,j1})$ determined in step S11 to calculate the gain correction coefficient $K_{j2}$ by the setting portion 663. It is stored as the gain table 64*d* in which the gain correction coefficient $K_{j2}$ is set with respect to each light receiving element included in the second light receiving element group.

<(8-2) Operation Flow Related to Correction of Wavelength Information and Measurement of Spectral Characteristics of Specimen to be Measured>

Figure 14:
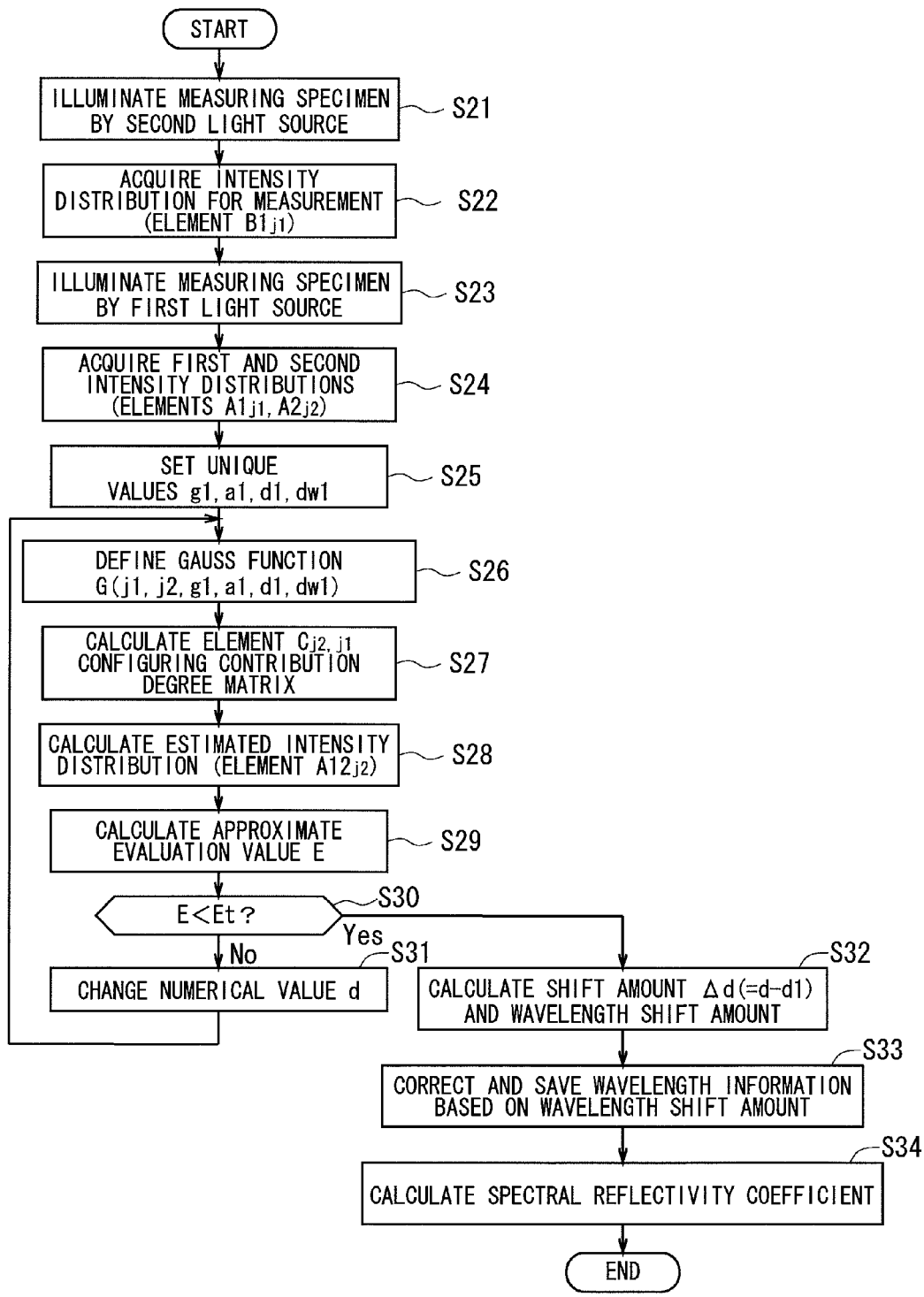
FIG. 14 is a flowchart showing a flow of a measurement operation of the spectral characteristic measuring device.
Figure 15:
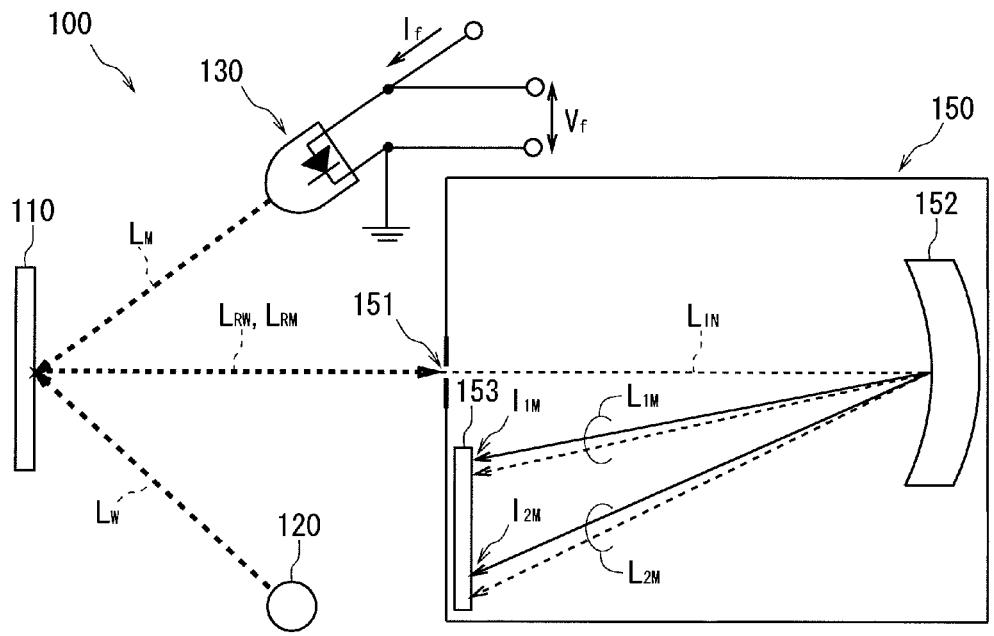
FIG. 15 is a view showing one configuration of a spectral characteristic measuring device.
Figure 16:
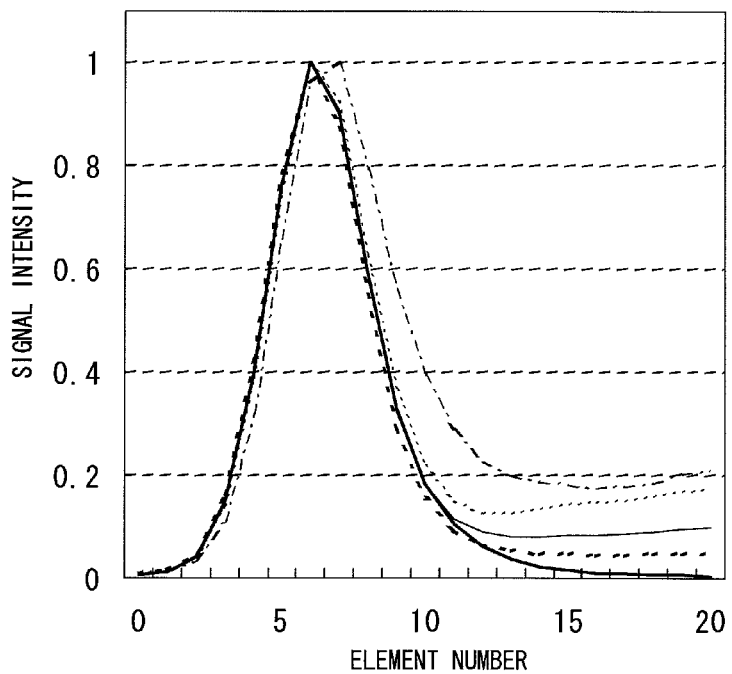
FIG. 16 is a view showing change of a first dispersion image according to specimens.

FIG. 14 is a flowchart showing a flow of a measurement operation in the spectral characteristic measuring device 1. This operation flow is executed by the control of the control device 60. The initial wavelength information 64*a* is stored in the storage unit 64 before the start of the operation flow, before the shipment of the spectral characteristic measuring device 1, and the like. For example, the operation flow starts in response to the operation of the operation unit 61 by the operator with the specimen to be measured 12 arranged in the spectral characteristic measuring device 1, and the process proceeds to step S21.

In step S21, the specimen to be measured 12 is illuminated by the measurement illuminating section 30. Specifically, the second light source 31 is turned ON, and the measurement light $L_W$ emitted from the second light source 31 is irradiated on the specimen to be measured 12. In this case, the light to be measured $L_{RW}$ enters the spectrometer 50 through the opening 511*o*. The incident light $L_{IN}$ is dispersed by the diffraction grating of the dispersion optical system 52, and irradiated on the light receiving unit 53.

In step S22, the signal intensity $B1_{j1}$, which is the element of the intensity distribution for measurement, is acquired from the signal outputted from the light receiving unit 53 by the signal processing unit 54 and the intensity distribution acquiring portion 662. Thereafter, the second light source 31 is turned OFF.

In step S23, the specimen to be measured 12 is illuminated by the correction illuminating section 20. Specifically, the first light source 21 is turned ON, and the monochromatic light $L_M$ emitted from the first light source 21 is irradiated on the specimen to be measured 12. In this case, the light to be measured $L_{RM}$ enters the spectrometer 50 through the opening 511*o*. The incident light $L_{IN}$ is then dispersed by the diffraction grating of the dispersion optical system 52, and the first dispersion image $I_{1M}$ is formed by the primary diffracted light $L_{1M}$ and the second dispersion image $I_{2M}$ is formed by the secondary diffracted light $L_{2M}$ on the light receiving unit 53.

In step S24, the signal intensity $A1_{j1}$, which is the element of the first intensity distribution related to the first dispersion image $I_{1M}$, and the signal intensity $A2_{j2}$, which is the element of the second intensity distribution related to the second dispersion image $I_{2M}$ are acquired from the signal outputted from the light receiving unit 53 by the signal processing unit 54 and the intensity distribution acquiring portion 662. Thereafter, the first light source 21 is turned OFF.

In step S25, the four numerical unique values a1, g1, d1, dw1 stored in the storage unit 64 are set as four numerical values a, g, d, dw of the Gaussian function by the first calculation portion 664.

In step S26, the Gaussian function shown in equation (2) is defined by the first calculation portion 664. First, when the process proceeds from step S25 to step S26, the four numerical values a, g, d, dw set in step S25 are substituted to equation (2) to define the Gaussian function. When the process proceeds from step S31 to step S26, the numerical value d changed in step S31 and the three numerical values a, g, dw set in step S25 are substituted to equation (2) to define the Gaussian function.

In step S27, the element $C_{j2, j1}$ of the contribution degree matrix $(C_{j2, j1})$ is calculated according to the Gaussian function defined in step S26 by the first calculation portion 664.

In step S28, the estimated intensity distribution having the signal intensity $A12_{j2}$ as the element is calculated by the first calculation portion 664. In this calculation, the column vector $(A1_{j1})$ having the signal intensity $A1_{j1}$ obtained in step S24 as the element, the contribution degree matrix $(C_{j2, j1})$ including the elements $C_{j2, j1}$ calculated in step S27, and the gain correction coefficient $K_{j2}$ stored in the storage unit 64 are applied to equation (1).

In step S29, a total sum of squares (a sum of squares) E of the difference between the signal intensity $A12_{j2}$ and the signal intensity $A2_{j2}$ obtained in the actual measurement in each element number j2 is calculated as the approximate evaluation value according to equation (6) by the second calculation portion 665.

In step S30, whether the sum of squares E calculated recently in step S29 is smaller than the predetermined threshold value Et is determined by the second calculation portion 665. The process proceeds to step S31 if the sum of squares E is not smaller than the predetermined threshold value Et, and the process proceeds to step S32 if the sum of squares E is smaller than the predetermined threshold value Et.

In step S31, the numerical value d is corrected by the first calculation portion 664, and the process proceeds to step S26. The processing of steps S26 to S31 are repeated until the sum of squares E becomes smaller than the predetermined threshold value Et.

In step S32, the change amount Δd(=d−d1) from the initial value d1 of the numerical value d to the numerical value d optimized in step S26 to step S31 is calculated by the second calculation portion 665. Furthermore, the change amount Δd is converted to the shift amount of the wavelength, so that the change amount (the wavelength shift amount) related to the wavelength information from the time of initial setting caused by the change in the spectrometer 50 is calculated by the second calculation portion 665.

In step S33, the wavelength information is corrected with the initial wavelength information 64*a* as the base according to the wavelength shift amount calculated in step S32 to generate the corrected wavelength information 64*b*. In this case, the generated corrected wavelength information 64*b* is stored in the storage unit 64. That is, the corrected wavelength information 64*b* is updated for every measurement related to the specimen to be measured 12.

In step S34, the signal intensity $B1_{j1}$ related to the intensity distribution for measurement acquired in step S22 is converted to spectral distribution based on the corrected wavelength information 64*b* generated in step S33 by the spectral distribution recognizing portion 667. The spectral reflectivity coefficient calculating portion 668 calculates a spectral reflectivity coefficient of the specimen to be measured 12 based on the spectral distribution obtained by the spectral distribution recognizing portion 667 and the calibration coefficient D0(λ) contained in the calibration information 64*e*. The spectral reflectivity coefficient of the specimen to be measured 12 calculated herein is stored in the storage unit 64 as the measurement result information 64*f*.

(9) Summary of One Embodiment

As described above, in the spectral characteristic measuring device 1 according to the present embodiment, even if the wavelength shift amount related to the wavelength information from the time of initial setting caused by the thermal change and the temporal change in the spectrometer 50 occurs, the wavelength information corresponding to the wavelength shift amount is corrected as needed. Thus, the measurement accuracy when the initial setting is carried out can be maintained. In particular, when the correction of the wavelength information corresponding to the wavelength shift amount is carried out, the specimen to be measured different from the reference specimen for correction is installed, and the spectral characteristic measuring device can be corrected rapidly and with high accuracy even if the spectral distribution of the monochromatic light for correction is changed from the time of initial setting.

The spectral characteristic measuring device 1 can be corrected based on the change amount of the wavelength information obtained using an arbitrary specimen to be measured 12. Since the measurement of the reference specimen is not necessary for the correction of the wavelength information, and automation of the correction of the spectral characteristic measuring device can be achieved. Furthermore, the measurement accuracy of the spectral characteristics can be enhanced by continuously performing both the correction of the wavelength information corresponding to the wavelength shift amount and the measurement of the spectral characteristics of the specimen to be measured 12 at substantially the same timing.

(10) Variation

The present invention is not limited to the embodiment described above, and various changes, modifications, and the like can be made within a scope not deviating from the gist of the invention.

⊕ For example, in one embodiment described above, the setting portion 663 is incorporated in the spectral characteristic measuring device 1 as a function for performing the initial setting in the spectral characteristic measuring device 1, but this is not the sole case. For example, an external device such as a personal computer, and the like may be connected to the control device 60, and the initial setting in the spectral characteristic measuring device 1 is realized by the function of the external device.

⊕ In one embodiment described above, the contribution degree matrix $(C_{j2, j1})$ and the gain correction column vector $(K_{j2})$ are determined by measuring the same reference specimen 11, but this is not the sole case. For example, the reference specimen 11 used in the determination of the contribution degree matrix $(C_{j2, j1})$ and the reference specimen 11 used in the determination of the gain correction column vector $(K_{j2})$ may be different.

In this case, when the monochromatic light $L_M$ emitted from the first light source 21 is irradiated in order to plurality types of reference specimen 11, pieces of lights to be measured $L_{RM}$ from the plurality types of reference specimens 11 are passed through the opening 511o and dispersed by the dispersion optical system 52, and irradiated on the light receiving unit 53. The predetermined relational expression is set based on the first intensity distribution and the second intensity distribution acquired by the intensity distribution acquiring portion 662 based on the signal corresponding to each reference specimen 11 output from the light receiving unit 53. The predetermined relational expression can be thus accurately obtained for a wider wavelength band.

For example, the contribution degree matrix $(C_{j2, j1})$ is determined based on the first intensity distribution and the second intensity distribution shown in FIG. 8 when the reference specimen 11 is a white reference surface, and the gain correction column vector $(K_{j2})$ can be determined based on the first intensity distribution and the second intensity distribution shown in FIG. 9 when the reference specimen 11 is a fluorescence brightening base material. In this case, the radiation light from the fluorescence brightening base material contains not only the reflected light but also fluorescence, and thus if the reference specimen 11 is a fluorescence brightening base material, the first intensity distribution and the second intensity distribution are obtained for a wider wavelength band than when the reference specimen 11 is a white reference surface. As a result, the gain correction column vector $(K_{j2})$ can be accurately obtained for the wide wavelength band.

When the predetermined relational expression is determined, two or more types of monochromatic light $L_M$ may be used instead of using two or more types of reference specimen 11.

⊕ In the embodiment described above, the first acquisition processing of acquiring the first intensity distribution and the second intensity distribution related to the light to be measured $L_{RM}$ from the specimen to be measured 12 corresponding to the illumination of the monochromatic light $L_M$ is carried out for every specimen to be measured 12, but is not limited thereto.

For example, when the monochromatic light $L_M$ emitted from the first light source 21 is irradiated with respect to a plurality of specimens to be measured 12 in order so that pieces of lights to be measured $L_{RM}$ from the plurality of specimens to be measured 12 are passed through the opening 511o and dispersed by the dispersion optical system 52 and irradiated on the light receiving section 53, the first acquisition processing may be the processing of acquiring the first intensity distribution and the second intensity distribution based on a plurality of signals related to the plurality of specimens to be measured 12 output in order from the light receiving unit 53. That is, the first intensity distribution and the second intensity distribution may be acquired by integrating the signal intensities related to the plurality of specimens to be measured 12 for the same element number.

As described above, a relationship unique to the spectrometer 50 is met between the first intensity distribution related to the first dispersion image $I_{1M}$ and the second intensity distribution related to the second dispersion image $I_{2M}$ regardless of the shapes of the first intensity distribution and the second intensity distribution. Such a relationship is also met for the first intensity distribution and the second intensity distribution generated by the integrations of the signal intensities. Thus, the S/N ratio in the first intensity distribution and the second intensity distribution improves.

If the wavelength shift amount is calculated based on the first intensity distribution and the second intensity distribution excellent in the S/N ratio acquired by integrating the signal intensities related to the plurality of specimens to be measured 12, the influence of noise is reduced. That is, the shift amount of the estimated intensity distribution and the second intensity distribution can be accurately obtained. As a result, the correction accuracy of the wavelength information corresponding to the wavelength shift amount can be enhanced. Such a mode is particularly effective when the reflectivity of the specimen to be measured 12 is low and the signal intensity obtained for one specimen to be measured 12 is small.

⊕ Furthermore, in one embodiment described above, the correction illuminating section 20 that is not used in the measurement of the spectral characteristics of the specimen to be measured 12 is arranged separately from the measurement illuminating section 30, but is not limited thereto. For example, when measuring the spectral characteristics of the specimen to be measured 12, which is a specimen containing fluorescence substance (also referred to as a fluorescence specimen), according to the technique described in Japanese Patent Application Laid-Open No. 2010-107316, the first illumination light including a combination of white light and radiation light of ultraviolet LED, and a second illumination light including only white light are alternately illuminated. In this case, the first intensity distribution and the second intensity distribution corresponding to the radiation light of the ultraviolet LED can be acquired from the difference between the signal intensity related to the signal outputted from the light receiving unit 53 according to the light to be measured $L_{R(W+M)}$ from the specimen to be measured 12 when the first illumination light is irradiated on the specimen to be measured 12, and the signal intensity related to the signal outputted from the light receiving unit 53 according to the light to be measured $L_{RW}$ from the specimen to be measured 12 when the second illumination light is irradiated on the specimen to be measured 12. The first intensity distribution and the second intensity distribution acquired in such a manner may be used to perform the calculation of the wavelength shift amount and the correction of the wavelength information corresponding to the wavelength shift amount.

Therefore, the following configuration may be adopted. First, in the first acquisition processing, when the monochromatic light $L_M$ including the ultraviolet light emitted from the first light source 21, and the measurement light $L_W$ emitted from the second light source 31 are irradiated on the specimen to be measured 12, the light to be measured $L_{R(W+M)}$ from the specimen to be measured 12 is passed through the opening 511o, dispersed by the dispersion optical system 52, and irradiated on the light receiving unit 53. In this case, the first signal is outputted from the light receiving unit 53. When the measurement light $L_W$ emitted from the second light source 31 is irradiated on the specimen to be measured 12, the light to be measured $L_{RW}$ from the specimen to be measured 12 is passed through the opening 511o, dispersed by the dispersion optical system 52, and irradiated on the light receiving unit 53. In this case, the second signal is outputted from the light receiving unit 53. Then, the first intensity distribution and the second intensity distribution can be acquired from the difference between the intensity of the first signal and the intensity of the second signal by the intensity distribution acquiring portion 662. In the second acquisition processing, the intensity distribution for measurement is acquired from both or one of the intensity of the first signal and the intensity of the second signal.

According to such configuration, the light source for performing the correction of the spectral characteristic measuring device 1 does not need to be arranged separately from the light source for measuring the spectral characteristics of the specimen to be measured 12. Thus, the device can be miniaturized and the manufacturing cost can be reduced. The time required for the measurement of the spectral characteristics including the correction of the spectral characteristic measuring device 1 can be reduced.

When the spectral characteristics related to the plurality of specimens to be measured 12 are continuously measured, a mode of acquiring the first intensity distribution and the second intensity distribution from the difference between the intensity of the first signal and the intensity of the second signal for every specimen to be measured 12 is not the sole case. For example, the first intensity distribution and the second intensity distribution may be acquired from the difference between the integrated intensity for every element number of the first signal and the integrated intensity for every element number of the second signal obtained for the plurality of the specimens to be measured 12.

In other words, the following configuration may be adopted. In the first acquisition processing, when the monochromatic light $L_M$ including the ultraviolet light emitted from the first light source 21 and the measurement light $L_W$ emitted from the second light source 31 are irradiated on a plurality of specimens to be measured 12 in order, pieces of lights to be measured $L_{R(W+M)}$ from the plurality of specimens to be measured 12 are passed through the opening 511o, dispersed by the dispersion optical system 52, and irradiated on the light receiving unit 53. In this case, the first signal related to each specimen to be measured 12 is outputted from the light receiving unit 53. When the measurement light $L_W$ emitted from the second light source 31 is irradiated in order on a plurality of specimens to be measured 12, pieces of lights to be measured $L_{RW}$ from the plurality of specimens to be measured 12 are passed through the opening 511o, dispersed by the dispersion optical system 52, and irradiated on the light receiving unit 53. In this case, the second signal related to each specimen to be measured 12 is outputted from the light receiving unit 53. In such a case, the first intensity distribution and the second intensity distribution can be acquired from the difference between the integrated value of the signal intensities of a plurality of first signals and the integrated value of the signal intensities of the plurality of second signals for every element number by the intensity distribution acquiring portion 662.

The S/N ratio in the first intensity distribution and the second intensity distribution is improved by adopting such a configuration. If the wavelength shift amount is calculated based on the first intensity distribution and the second intensity distribution excellent in the S/N ratio acquired by integrating the signal intensities related to the plurality of specimens to be measured 12, the influence of noise is reduced. That is, the shift amount of the estimated intensity distribution and the second intensity distribution can be accurately obtained. As a result, the correction accuracy of the wavelength information corresponding to the wavelength shift amount can be enhanced. Such a mode is particularly effective when the reflectivity of the specimen to be measured 12 is low and the signal intensity obtained for one specimen to be measured 12 is small.

⊕ In one embodiment described above, the monochromatic light $L_M$ is irradiated on the reference specimen 11 at the time of initial setting and the light to be measured $L_{RM}$ from the reference specimen 11 is entered to the spectrometer 50, but this is not the sole case. For example, a filter to be passed by for passing a predetermined monochromatic light may be installed in place of the reference specimen 11, and the monochromatic light generated when the white light and the like passes through the filter may be entered to the spectrometer 50.

⊕ In one embodiment described above, in the correction of the wavelength information corresponding to the wavelength shift amount, the wavelength information is corrected with the initial wavelength information 64a as a base to generate the corrected wavelength information 64b, but this is not the sole case. For example, the wavelength information may be further corrected with the corrected wavelength information 64b as the base to sequentially update the corrected wavelength information 64b.

⊕ In one embodiment described above, determination is made that the signal intensity $A12_{j2}$ is approximate to the signal intensity $A2_{j2}$ if the sum of squares E of the difference between the signal intensity $A12_{j2}$ and the signal intensity $A2_{j2}$ is smaller than the predetermined threshold value Et, but is not limited thereto.

For example, while at least one of the second intensity distribution having the signal intensity $A2_{j2}$ as the element and the estimated intensity distribution having the signal intensity $A12_{j2}$ as the element calculated using the relational expression by the initial contribution degree matrix ($C_{j2,j1}$) and the gain correction vector determined and stored at the time of manufacturing is relatively moved by a predetermined amount in a direction of the axis of the element number, the signal intensity $A12_{j2}$ and the signal intensity $A2_{j2}$ are compared, and determination may be made that the signal intensity $A12_{j2}$ is approximate to the signal intensity $A2_{j2}$ when the sum of squares E of the difference between the signal intensity $A12_{j2}$ and the signal intensity $A2_{j2}$ becomes a minimum. In this case, the relative movement amount corresponds to the change amount of the numerical value d. The predetermined amount merely needs to be a value corresponding to the correction accuracy of the wavelength information, and for example, if the correction accuracy is 0.1 nm, the predetermined amount may be 0.1 nm.

In this case, a correlation coefficient indicating the correlation between the signal intensity $A12_{j2}$ and the signal intensity $A2_{j2}$ is adopted in place of the sum of squares E, and determination may be made that the signal intensity $A12_{j2}$ is approximate to the signal intensity $A2_{j2}$ when the correlation coefficient becomes a maximum.

The shift amount between the estimated intensity distribution and the second intensity distribution can be accurately obtained even if such a configuration is adopted.

⊕ It should be recognized that all or a part of the embodiment described above and the various variations can be appropriately combined within a reasonable scope.

DESCRIPTION OF SYMBOLS 1 spectral characteristic measuring device
11 reference specimen
12 specimen to be measured
20 correction illuminating section
21 first light source
22 first light source control unit
30 measurement illuminating section
31 second light source
32 second light source control unit
40 light guiding section
50 spectrometer
51 light shielding body
511 open portion
511o opening
52 optical system
53 light receiving unit
54 signal processing unit
60 control device
64 storage unit
66 control unit
661 lighting control portion
662 intensity distribution acquiring portion
663 setting portion
664 first calculation portion
665 second calculation portion
666 correction portion
667 spectral distribution recognizing portion
668 spectral reflectivity coefficient calculating portion

The invention claimed is:

1. A spectral characteristic measuring device comprising a spectrometer and a control device, wherein
said spectrometer includes,
a light shielding body provided with an opening,
a light receiving unit in which a plurality of light receiving elements are arrayed in a direction along one axis and that outputs a signal from each of said light receiving elements according to an irradiation light quantity, and
an optical system that disperses the light passed through said opening according to a wavelength to form a dispersion image on said light receiving unit; and
said control device includes,
a storage unit for storing wavelength information indicating a correspondence relationship between said plurality of light receiving elements and wavelengths of piece of lights irradiated on said plurality of light receiving elements,
an intensity distribution acquiring portion for acquiring a first intensity distribution related to a first dispersion image and a second intensity distribution related to a second dispersion image based on the signal outputted from each of said light receiving elements when a monochromatic light is passed through said opening and said first dispersion image related to a primary diffracted light and said second dispersion image related to a secondary diffracted light are formed on said light receiving unit,
a first calculation portion for calculating an estimated intensity distribution related to said second dispersion image from said first intensity distribution according to a predetermined relational expression,
a second calculation portion for calculating a change amount related to said wavelength information corresponding to a shift amount between said estimated intensity distribution and said second intensity distribution with respect to a direction along said one axis by a comparison of said estimated intensity distribution and said second intensity distribution while relatively moving at least one of said estimated intensity distribution and said second intensity distribution in a direction along an axis corresponding to a direction along said one axis, and
a correction portion for correcting said wavelength information according to said change amount.

2. The spectral characteristic measuring device according to claim 1, wherein
said plurality of light receiving elements include
a first light receiving element group to be formed with said first dispersion image and a second light receiving element group to be formed with said second dispersion image, and
said predetermined relational expression includes
a first portion for calculating a temporary intensity distribution related to said second dispersion image from said first intensity distribution according to an association degree between each intensity component of said first intensity distribution and each intensity component of said second intensity distribution, and
a second portion for calculating said estimated intensity distribution from said temporary intensity distribution while reflecting a difference in efficiency from said passing of the light at said opening to the output of the signal by each light receiving element between said first light receiving element group and said second light receiving element group.

3. The spectral characteristic measuring device according to claim 2, wherein
said first portion is a mathematical distribution function,
said distribution function is a distribution function in which a first numerical value specifying an array position related to said one axis of each light receiving element included in said first light receiving element group and a second numerical value specifying an array position related to said one axis of each light receiving element included in said second light receiving element group are independent variables, said distribution function being a distribution function with respect to said first numerical value, and a center of the distribution being given by said second numerical value.

4. The spectral characteristic measuring device according to claim 3, wherein
said distribution function includes
one of Gaussian function and triangular function.

5. The spectral characteristic measuring device according to claim 2, wherein
said first calculation portion calculates said estimated intensity distribution from said temporary intensity distribution by said second portion based on a table in which a gain correction coefficient is set with respect to each light receiving element included in said second light receiving element group.

6. The spectral characteristic measuring device according to claim 1, wherein
said second calculation portion calculates as said change amount, a relative movement amount of when a sum of squares of a difference between said estimated intensity distribution and said second intensity distribution becomes a minimum or a value indicating a correlation between said estimated intensity distribution and said second intensity distribution becomes a maximum while relatively moving at least one of said estimated intensity distribution and said second intensity distribution by a predetermined amount in a direction of an axis corresponding to a direction of said one axis.

7. The spectral characteristic measuring device according to claim 1, wherein
said second calculation portion calculates, as said change amount, a relative movement amount of when a sum of squares of a difference between said estimated intensity distribution and said second intensity distribution becomes smaller than a threshold value or a correlation coefficient between said estimated intensity distribution and said second intensity distribution becomes greater than a threshold value while relatively moving at least one of said estimated intensity distribution and said second intensity distribution in a direction of an axis corresponding to a direction of said one axis.

8. The spectral characteristic measuring device according to claim 1, further comprising:
a first light source that emits a monochromatic light; and
a second light source that emits a measurement light, wherein
said intensity distribution acquiring portion performs
first acquisition processing of acquiring said first intensity distribution and said second intensity distribution based on a signal outputted from said light receiving unit when said monochromatic light emitted from said first light source is irradiated on a specimen and a light to be measured from said specimen is passed through said opening and dispersed by said optical system to be irradiated on said light receiving unit, and
second acquisition processing of acquiring an intensity distribution for measurement based on the signal outputted from said light receiving unit when said measurement light emitted from said second light source is irradiated on said specimen and a light to be measured from said specimen is passed through said opening and dispersed by said optical system to be irradiated on said light receiving unit.

9. The spectral characteristic measuring device according to claim 8, wherein
said control device further includes a lighting control portion that controls said first light source and said second light source so that irradiation on said specimen by said monochromatic light emitted from said first light source in said first acquisition processing and irradiation on said specimen by said measurement light emitted from said second light source in said second acquisition processing are carried out within a predetermined period.

10. The spectral characteristic measuring device according to claim 8, wherein
said intensity distribution acquiring portion acquires said first intensity distribution and said second intensity distribution based on a plurality of signals related to a plurality of specimens outputted from said light receiving unit when said monochromatic light emitted from said first light source is irradiated on said plurality of specimens in order and the pieces of light to be measured from said plurality of specimens are passed through said opening and dispersed by said optical system to be irradiated on said light receiving unit in said first acquisition processing.

11. The spectral characteristic measuring device according to claim 8, wherein
said monochromatic light includes an ultraviolet light,
said intensity distribution acquiring portion acquires
in said first acquisition processing, said first intensity distribution and said second intensity distribution from a difference between an intensity of a first signal, which is outputted from said light receiving unit when said monochromatic light emitted from said first light source and said measurement light emitted from said second light source are irradiated on said specimen so that light to be measured from said specimen is passed through said opening, dispersed by said optical system and irradiated on said light receiving unit, and an intensity of a second signal, which is outputted from said light receiving unit when said measurement light emitted from said second light source is irradiated on said specimen so that light to be measured from said specimen is passed through said opening, dispersed by said optical system and irradiated on said light receiving unit, and acquires
in said second acquisition processing, the intensity distribution for measurement from both or one of the intensity of said first signal and the intensity of said second signal.

12. The spectral characteristic measuring device according to claim 11, wherein
said intensity distribution acquiring portion acquires, in said first acquisition processing, said first intensity distribution and said second intensity distribution from a difference between integrated intensities of a plurality of first signals related to a plurality of specimens outputted from said light receiving unit when said monochromatic light emitted from said first light source and said measurement light emitted from said second light source are irradiated on said plurality of specimens in order so that pieces of lights to be measured from said plurality of specimens are passed through said opening, dispersed by said optical system and irradiated on said light receiving unit, and integrated intensities of a plurality of second signals related to a plurality of specimens outputted from said light receiving unit when said measurement light emitted from said second light source is irradiated on said plurality of specimens in order so that said pieces of lights to be measured from said plurality of specimens are passed through said opening, dispersed by said optical system and irradiated on said light receiving unit.

13. The spectral characteristic measuring device according to claim 1, wherein
said control device further includes a setting portion for setting said predetermined relational expression based on said first intensity distribution and said second intensity distribution.

14. The spectral characteristic measuring device according to claim 13, wherein
said setting portion sets said predetermined relational expression based on said first intensity distribution and said second intensity distribution acquired by said intensity distribution acquiring portion based on a plurality of signals related to plurality types of reference specimens outputted from said light receiving unit when said monochromatic light emitted from said first light source is irradiated on said plurality types of reference specimens so that pieces of lights to be measured from said plurality types of reference specimens are passed through said opening, dispersed by said optical system, and irradiated on said light receiving unit.

15. A method for correcting a spectral characteristic measuring device including a spectrometer, said spectrometer including:
a light shielding body provided with an opening;
a light receiving unit, in which a plurality of light receiving elements is arrayed in a direction along one axis and that outputs a signal from each of the light receiving elements according to an irradiation light quantity; and
and an optical system that disperses the light passed through said opening according to a wavelength to form a dispersion image on said light receiving unit,
said method comprising the steps of:
storing in a storage unit wavelength information indicating a correspondence relationship between said plurality of light receiving elements and wavelengths of pieces of lights irradiated on said plurality of light receiving elements;
acquiring a first intensity distribution related to a first dispersion image and a second intensity distribution related to a second dispersion image by an intensity distribution acquiring portion based on the signal outputted from each of the light receiving elements when a monochromatic light is passed through said opening and said first dispersion image related to a primary diffracted light and said second dispersion image related to a secondary diffracted light are formed on said light receiving unit;
calculating by a first calculation portion an estimated intensity distribution related to said second dispersion image from said first intensity distribution according to a predetermined relational expression;
calculating by a second calculation portion a change amount related to said wavelength information corresponding to a shift amount between said estimated intensity distribution and said second intensity distribution with respect to a direction along said one axis by a comparison of said estimated intensity distribution and said second intensity distribution while relatively moving at least one of said estimated intensity distribution and said second intensity distribution in a direction along an axis corresponding to a direction along said one axis; and
correcting with a correction portion said wavelength information according to said change amount.

16. A non-transitory computer readable recording medium storing a computer-readable program, said program controlling a spectral characteristic measuring device to operate as one spectral characteristic measuring device, and said one spectral characteristic measuring device comprising a spectrometer and a control device, wherein
said spectrometer includes,
a light shielding body provided with an opening,
a light receiving unit in which a plurality of light receiving elements are arrayed in a direction along one axis and that outputs a signal from each of said light receiving elements according to an irradiation light quantity, and
an optical system that disperses the light passed through said opening according to a wavelength to form a dispersion image on said light receiving unit; and
said control device includes,
a storage unit for storing wavelength information indicating a correspondence relationship between said plurality of light receiving elements and wavelengths of piece of lights irradiated on said plurality of light receiving elements,
an intensity distribution acquiring portion for acquiring a first intensity distribution related to a first dispersion image and a second intensity distribution related to a second dispersion image based on the signal outputted from each of said light receiving elements when a monochromatic light is passed through said opening and said first dispersion image related to a primary diffracted light and said second dispersion image related to a secondary diffracted light are formed on said light receiving unit,
a first calculation portion for calculating an estimated intensity distribution related to said second dispersion image from said first intensity distribution according to a predetermined relational expression,
a second calculation portion for calculating a change amount related to said wavelength information corresponding to a shift amount between said estimated intensity distribution and said second intensity distribution with respect to a direction along said one axis by a comparison of said estimated intensity distribution and said second intensity distribution while relatively moving at least one of said estimated intensity distribution and said second intensity distribution in a direction along an axis corresponding to a direction along said one axis, and
a correction portion for correcting said wavelength information according to said change amount.

* * * * *